Feb. 22, 1949.  W. D. FOSTER  2,462,083
FILM HANDLING APPARATUS AND
MAGAZINE FOR USE THEREWITH
Filed May 18, 1944  4 Sheets-Sheet 1

Inventor
Warren Dunlap Foster
By
Attorney

Feb. 22, 1949.  W. D. FOSTER  2,462,083
FILM HANDLING APPARATUS AND
MAGAZINE FOR USE THEREWITH
Filed May 18, 1944  4 Sheets-Sheet 2
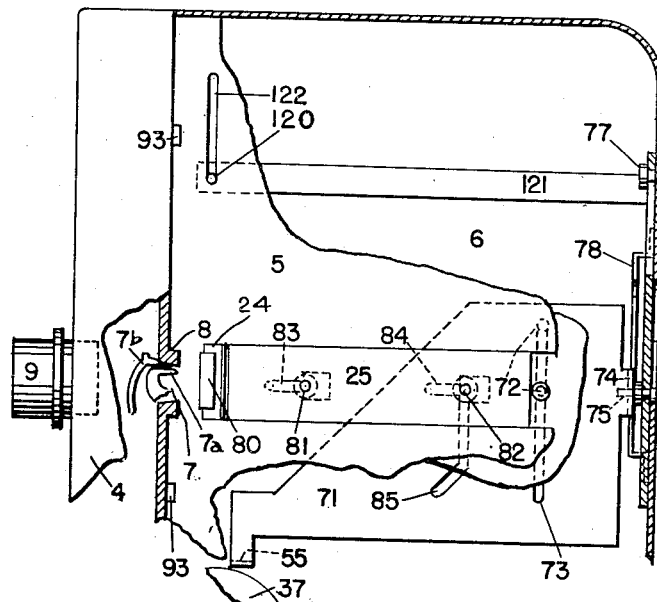
FIG. 6
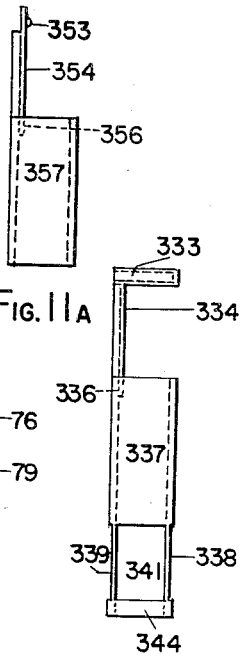
FIG. 11A
FIG. 11
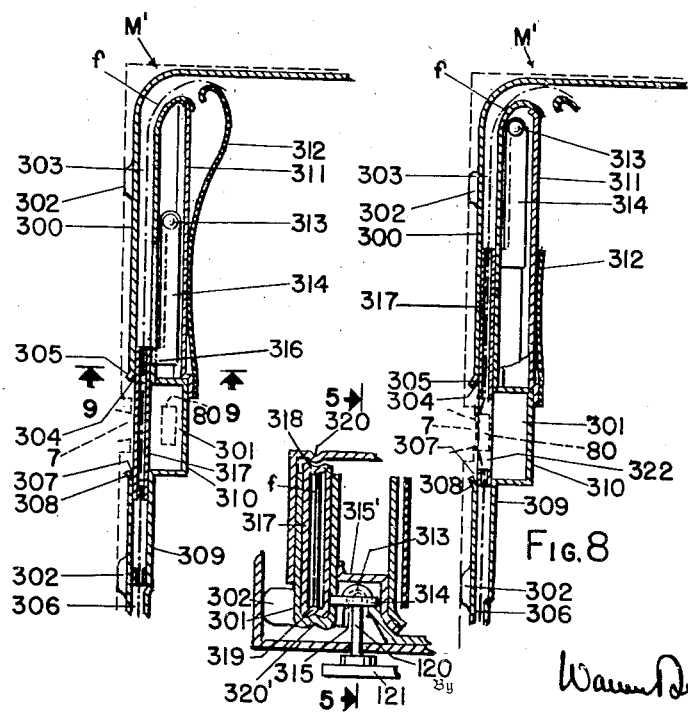
FIG. 7  FIG. 9  FIG. 8
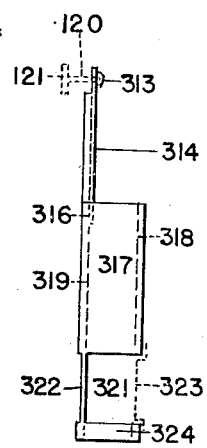
FIG. 10
Inventor
Warren Dunham Foster
By
Attorney Feb. 22, 1949.                W. D. FOSTER                 2,462,083
                     FILM HANDLING APPARATUS AND
                     MAGAZINE FOR USE THEREWITH
Filed May 18, 1944                                   4 Sheets-Sheet 3
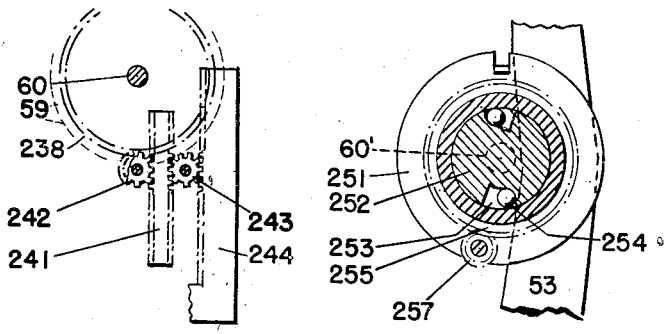
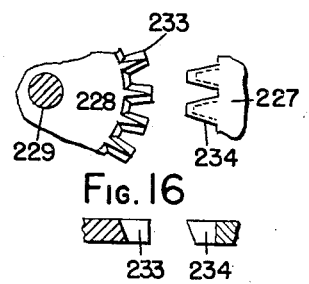
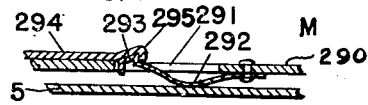
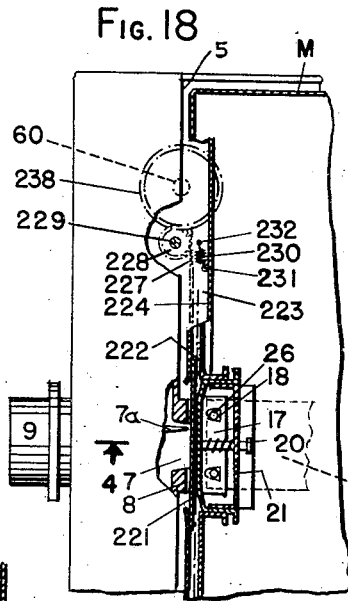
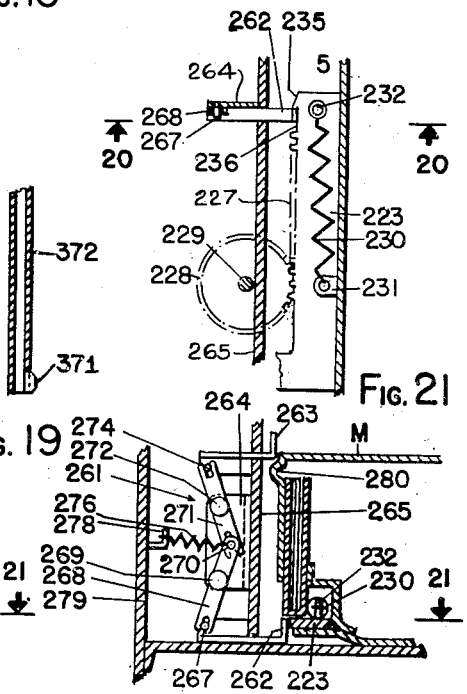
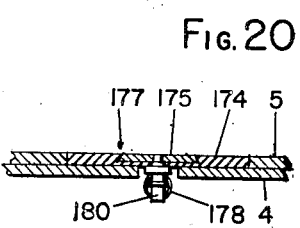
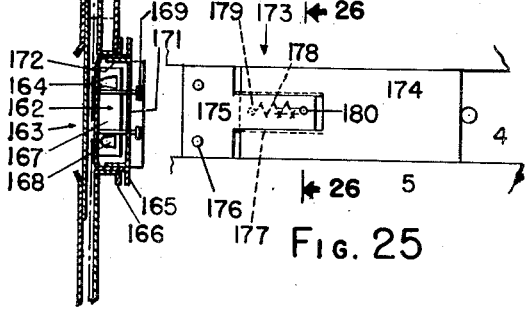
Inventor
Warren Dunham Foster
By
Attorney Feb. 22, 1949.　　　　　W. D. FOSTER　　　　　2,462,083
FILM HANDLING APPARATUS AND
MAGAZINE FOR USE THEREWITH Filed May 18, 1944　　　　　　　　　　　　　　　4 Sheets-Sheet 4

Inventor
Warren Dunham Foster
By
Attorney

Patented Feb. 22, 1949

2,462,083

UNITED STATES PATENT OFFICE 2,462,083

FILM HANDLING APPARATUS AND MAGAZINE FOR USE THEREWITH

Warren Dunham Foster, Eustis, Fla.

Application May 18, 1944, Serial No. 536,128

111 Claims. (Cl. 88—18.4)

My invention may be particularly applied to motion picture and other film handling and photographic apparatus for use by amateurs but its utility is not so limited. I am illustrating my invention as applied to a magazine and camera but in certain of its phases my invention can be used in any apparatus and its magazine for the projection or exposure or printing of pictures or of images representing sound.

My invention relates particularly to improved magazines for use with film handling apparatus, the magazines and apparatus being so arranged that the film carried by the magazine is brought into the focal plane of a lens of the apparatus and critically positioned and maintained therein solely by mechanism which is a part of the apparatus. It also relates to the provision of devices which effectively protect a film from mishandling and light except when it is being exposed or projected and automatically control and operate such devices in necessary and desirable sequential and other timed relation to the operation of various of the operable parts of the apparatus.

As it is well known to those skilled in this art, many film containing magazines are manufactured and sold for every camera for use with which they are adapted. In spite of the greatly added convenience and efficiency of a magazine in comparison with an open reel of film, users object to paying a greatly increased price for a film within a magazine. For these and other reasons, a magazine must be cheaply constructed. It may be subjected to hard usage and damage. The establishment and maintenance of the film in the focal plane of the apparatus, however, must be carried out with extreme accuracy, a difference of a few microns in certain types of photography meaning the difference between good results and failure. For these reasons and others, I much prefer that all of the instrumentalities by which this critical operation is carried out be a part of the apparatus, which can be constructed with rigidity, care and precision, and not of the cheaply built and more or less abused magazine.

The only type of magazine known to me which is completely adapted for use in a self threading apparatus and meets the above tests is that described by George William Ford in his United States Patent Number 1,944,023, dated January 16, 1934 and in various improvements thereover by this inventor and myself and others associated with us and including particularly the highly developed Morsbach magazine and apparatus for use therewith which has been very widely used commercially for many years. This Morsbach apparatus is perhaps best illustrated by his United States Patent Number 2,175,538 dated October 10, 1939 and Patent Number 2,159,993 dated May 30, 1939.

A magazine constructed in accordance with the above patents includes a substantially rectangular flat container having parallel side walls joined by edge walls in one of which a recess is formed which when the magazine is placed within a camera faces toward the lens and intersects the optical axis, such axis being parallel to the plane of the side walls of the camera. A film supported by such a magazine (always considered as being within an apparatus which is ordinarily held as for the taking of pictures) passes from a delivery coil therein through a first or upper opening in an edge wall bounding said recess adjacent the upper front edge thereof and across said recess and into the interior of the magazine through a second or lower opening in said edge wall bounding said recess aligned with said first opening and adjacent the lower front edge of said recess. Thus an operative length of the film bridges this recess. The rear side of this section of the film, which is relatively adjacent the back of the recess but well spaced therefrom, is accessible to engagement by a presser member of an apparatus adapted for use therewith and its opposite or forward side is accessible to a fixed apertured member of the apparatus.

In a compartment in a film handling apparatus adapted to receive such a magazine a movable gate member and a fixed apertured gate member are so disposed in relation to the position to be occupied by the magazine when it is within the compartment that at that time a film which is thus bridging the recess near its forward face is disposed between these members and out of contact with each of them. Such a fixed apertured gate member must project slightly backwardly from the lens into a compartment for the reception of the magazine. Then, after a cover of the compartment is closed, the movable gate member, preferably automatically, is brought forwardly toward the lens and presses the film against the apertured member which is fixed in the focal plane of the instrument. Preferably the gate closing operation accomplishes the above results and also releases a feeding mechanism so that it can be operated at will only after the film is in running position and the gate closed. It will be noted that this threading operation including the placing of the film into operative relation with the apparatus and its maintenance therein is accomplished solely by devices carried and operated by the apparatus.

Another widely used type of magazine includes a container which is entirely closed except for a film exposure aperture. A resilient member constantly presses the film toward this aperture and, when the magazine is outside of a camera, against it. The apparatus includes a fixed apertured gate member defining the focal plane of the camera and of such size and position that when the magazine in its entirety is bodily moved forwardly toward the lens and into its running position within the camera this fixed gate member projects into the magazine and bears against the film and through it forces the resilient member backwardly, the film thus being brought into the focal plane.

Alternately as in my Patent Number 2,277,695 dated March 31, 1942, mechanism carried by a front wall of the magazine may engage a part of the camera and force a presser member toward an apertured member fixed upon the camera. Such arrangements have certain advantages but they still depend upon the magazine for extensive cooperation in a critical operation. Moreover, they necessitate a bodily movement of the magazine toward the lens in a direction along the optical axis. Such movement has many disadvantages over a movement of a magazine into position in a direction normal to the axis, as with the Morsbach magazine. In the first case, the user pushes a magazine into a compartment through an opening in the end thereof away from the lens and must pull it out after use or special mechanism must be provided bodily to propel the magazine forwardly and then eject it. In the case of a magazine of the Morsbach type, a user merely drops the magazine into its receptacle, closes and latches the cover, and takes a picture. Such end-wise insertion of a magazine is particularly disadvantageous in apparatus such as that described and claimed in the co-pending application of Oliver Whitwell Wilson and myself Serial Number 500,862 filed September 1, 1943, which upon December 25, 1945, matured as Patent Number 2,391,497, and of the application parent thereof of the said Wilson and myself Serial Number 357,802 filed September 21, 1940, which upon June 13, 1944, matured as Patent Number 2,351,088. In these applications, apparatus is described and claimed for the alternative use of films coiled upon open reels and of films housed within a magazine and also magazines especially adapted for such apparatus. As fully set forth in said applications, in spite of the many advantages of a magazine, notably those of self-threading and instant interchangability in the field, many persons wish to be able to use films upon open reels. Such films are likely to be cheaper and can be universally obtained. Consequently, film handling apparatus such as those described and claimed in the said co-pending applications have many advantages. In double-purposed film handling apparatus however, it is more difficult to use magazines which must be bodily moved along the line of the optical axis of the apparatus rather than those of the Morsbach type which like an open reel can be put into a film receiving compartment from its side, that is, in a direction normal to such axis.

In magazines of the Ford-Morsbach type, one and the only disadvantage known to me is that the film which extends across the gate receiving recess needs protection both from careless handling and from light. Protection from careless handling is well obtained in the said Ford patent and others related thereto.

A principal object of the present invention is to provide a magazine and apparatus for use therewith which conserves all of the great and long-proved advantages of the Morsbach magazine and apparatus and at the same time avoids this one difficulty.

To accomplish this object and others, I provide film handling apparatus including a magazine which has a closed instead of an open recess. Alternatively, I provide film handling apparatus including a magazine with an open recess and a tubular light-trap which completely protects the length of film which bridges said open recess. In each phase my invention includes provision of sequential control mechanism.

The closed recess of my novel magazine completely protects the rear side of the film, that is the side relatively distant from the lens when a magazine is in position in a camera. Such protection is afforded by a presser member and light trapping means associated therewith. The presser member is loosely positioned upon the magazine adjacent the film but completely inert until engaged by a gate member disposed upon the apparatus and inserted within the closed recess of the magazine through a side of said recess relatively adjacent the floor of the magazine as the magazine is placed within the camera. In apparatus so constructed a user merely drops the magazine within its compartment in a direction normal to the optical axis and to the plane of the opening of the magazine receiving compartment and by that act connects the previously inoperable presser member with the gate operating means of the camera. These gate operating means, preferably automatically as by the latching of the cover as in the Morsbach apparatus, operate the presser member to move the film into its focal plane and are solely responsible for critically maintaining it therein. These instrumentalities enter the closed recess from the side thereof which is adjacent the floor of the magazine as the magazine is placed in position. The other side of said recess is preferably closed by a cover of the magazine. To protect the other or forward side of the film I provide a single bladed light-trap which while in a first or protective position is disposed across the mouth of the closed recess and adjacent the side of the film opposite that which is engaged by the presser member and a second or exposing position wherein the light-trap is moved to a position within the magazine thus freeing the film for engagement by a relatively fixed apertured gate member and film feeding means. Automatic mechanism moves this light-trap from such first to such second position only after the camera has been placed within its compartment and the cover closed and latched and before the gate has been closed by the apparatus. Provision of sequential and automatic mechanism to accomplish these ends is an important part of this invention.

As is of course clear to those skilled in this art, any apertured member which defines the focal plane of such an apparatus must project slightly backwardly from the lens and to a position within a film receiving compartment so that a film carried by a magazine when positioned therein may be engaged thereby. Hence, a magazine and a light-trap for an exposure opening thereof must be so arranged that when the magazine is placed in position, no matter from what direction, the light-trap must always clear the apertured fixed member. The light-trap in apparatus having a side opening magazine compartment, as does this—that is, an opening which lies in a plane parallel to the optical axis of the appartus—cannot be withdrawn before the magazine is substantially in its running position.

According to this invention and in order to avoid the conflict suggested above, I provide a threading path for a film wherein the film protected by its light-trap is disposed in a straight line across the front of the recess in a magazine. This threading path, together with the film and that portion of the light-trap and other structure disposed between the film and the apertured gate plate, when the magazine is in assembled relation with the apparatus is so disposed that the apertured gate member does not engage therewith. Thus, when the magazine is placed in its compartment the threading path and the light-trap initially are situated away from the apertured member and back from the lens. After the light-trap has been withdrawn a presser member brings the film slightly forwardly from a straight line across the face of the recess and into its operational path and into engagement with the film engaging surface of the apertured member which defines the focal plane and hence is a portion of said path. It will thus be seen that I provide an operational path for the film which is forwardly or toward the lens from its threading path and that the film when in such path is brought forwardly or toward the lens and is therefore slightly displaced in such forward direction from the straight threading path across the face of the recess. The extent to which the film is bent forwardly out of the threading path into its operational path is very slight but is essential in a fully developed apparatus constructed in the preferred manner illustrated herein. I later refer to other constructions which may be used in the practice of my invention.

In order thus to position this threading path back of the operational path I either construct a magazine so that the film is spaced slightly backwardly of its front edge or, to save space, place positioning formations upon either the front of the compartment or the front of the magazine which slightly space the magazine from the apertured gate number when the magazine is placed in operative position.

Among the important objects of my invention is the construction of apparatus in accordance with the above portion of this specification and to accomplish the above stated results.

I also illustrate my invention by various modifications wherein spring pressure is applied to a presser member forming one side of my novel closed recess only by devices carried and positioned by the apparatus and effective only when the magazine and apparatus have been placed in assembled relation and following operation of automatically actuated mechanism. I may dispose resilient means, which in one modification may take the form of a single leaf spring, upon the side of the presser member away from the lens in such fashion that such resilient means are entirely inoperable until engaged and put under tension by a movement of a member carried by the apparatus. Alternatively, I may mount the resilient means upon the apparatus in the form of resilient upstanding posts which engage and operate the presser member, both moving it to operative position and thereafter furnishing the resilience demanded by a feeding operation. Alternatively, I may employ two upstanding rigid posts spanned by a forwardly projecting single leaf spring which when the apparatus is moved to running position engages the backward portion of the presser member and both positions and tensions it. Another and preferred modification consists of a duplex gate bracket whereby one portion which operates my presser member is mounted upon a main portion for resilient movement relatively thereto and bodily movement therewith. Such movements thereupon bring the presser member and the film from the threading to the operational path and thereafter furnish the necessary resilience. It will be understood that in all such modifications the instrumentality indicated above which is carried by an apparatus is introduced into my novel closed recess through an opening in a side thereof and in a direction normal to the optical axis of the magazine and apparatus.

Among the important objects of my invention therefore is to furnish improved gate structure with film contacting instrumentalities carried by the magazine and with moving, controlling and tensioning instrumentalities or moving and controlling instrumentalities carried and operated by the apparatus.

Another chief object of this invention is to conserve all of the advantages of film handling apparatus and a magazine for use therewith which has an open recess and at the same time to protect the side of the film adjacent said recess both from mishandling and light.

Other objects are to furnish either alone or in combination with a gate structure such as any one of those previously or hereafter described novel and improved light trapping devices for protecting the opposite or forward side of the film.

As previously stated I may accomplish somewhat similar results but in a different manner by making use of tubular light-trap or sleeve shaped member which extends across the front of a recess in a magazine. Such a tubular member must be positioned as previously described so that its threading position does not conflict with the fixed gate section when the magazine is inserted into its compartment or removed therefrom. Thus I provide a tubular light-trap completely enclosing the film and extending straight across the front of the recess in a threading path spaced as above described. By automatic means effective after the magazine has been disposed in a camera I first move this tube from said path so that it clears the film and is retracted into the magazine. A following portion of this automatic operation brings the presser member into contact with the film and advances it into its operational path, forwardly of its threading path, and into contact with an apertured gate member which defines the focal plane, the feeding mechanism having been released for operation when desired.

A chief object therefore of my invention is to furnish tubular light trapping means of the above characteristics.

Either my single bladed or tubular light-trap may be operated by movement of a latch for a cover of a film receiving compartment, always, however, in the proper sequential relation to the movement of the gate section and preferably to the control of the feeding mechanism. Alternatively, I may provide mechanism which interlocks a light-trap and mechanism which starts and stops a feeding operation. The light-trap may be moved between protective and running positions when a feeding operation is started and back to protective position every time such operation is stopped. Alternatively and as claimed in an application divisional herefrom, and much preferably however, the light-trap may be moved from protective to feeding position by means which start the operation of the feeding mechanism but moved back to protective position only when the magazine is removed from its compartment.

Among the important objects of my invention is the provision of such control mechanism.

Within magazines constructed in accordance with the said Morsbach patents, a closed delivery channel is formed from a delivery coil of film to an opening disposed adjacent the front upper edge of a recess and a take-up channel from an opening in alignment therewith to a point adjacent a take-up coil. A portion of each of these channels is preferably formed of a resilient member in the manner described and claimed in my Patent Number 1,975,782 dated October 9, 1943, which makes use of the Bundick and Proctor tension control system of feeding as claimed in their Patent Number 1,944,022 dated January 16, 1934, and others related thereto. According to this construction complete compensation is provided for the difference in character of movement of the continuously operating delivery and take-up masses and the intermittently moving length of film at an aperture without the introduction of continuously rotating sprockets and all the expense, complications and difficulties which they involve. An important object of the present invention is to furnish means for continuing such a channel across such a recess while the magazine is positioned outside of the apparatus and withdrawing such portion of the channel when the magazine is placed within the apparatus, all by automatic and sequential control mechanism.

This application is a continuation-in-part of the co-pending application of Oliver Whitwell Wilson and myself Serial Number 500,862 filed September 1, 1943, patented upon December 25, 1945, as Number 2,391,497, which in turn is a continuation-in-part of its parent application of the said Wilson and myself co-pending therewith and herewith, Serial Number 357,802 filed September 21, 1940, which upon June 13, 1944, matured as Patent Number 2,351,088. In said co-pending parent Patent Number 2,391,497 a tubular light-trap is shown which per se closely resembles that shown herein. In that application, however, such a light-trap is operated preferably by the movement of the cover of a film compartment. A chief object of this invention is to provide a light-trap, tubular or single bladed, which may be so operated.

In said co-pending parent Patent Number 2,391,497 the said light-trap and the film which it surrounds are positioned in a threading path which extends across a recess of a magazine of the Morsbach type but not at the front thereof. Instead the operational path of the film extends between aligned openings, one in the front of the upper wall of the recess and the other in the front of the bottom wall while the threading path is disposed between this operational path and the back of the recess so that the tubular light-trap and the apertured gate member clear each other. After the magazine is in place, the light-trap is automatically moved from its protective or threading position to a running position wherein it is disposed within the magazine and in line with the operational path of the film. Such movement brings the film into its operational path and into alignment with the apertured gate member. The film then extends straight across the mouth of the magazine. Then the presser member is operated to press and hold the film into such running position. Thus in the parent patent a presser member of the magazine as it moves forwardly into position does not displace the film from a substantially straight line across the recess. An important object, therefore, of this invention is to furnish a light trapping tube which may be operated as therein described.

A stated object of said co-pending Patent Number 2,391,497 is to provide improved means for operating a light-trap such as is shown and claimed herein in interlocked relation to the operation of an improved edge guide, gate section, a lock or protection for a film meter, a lock for a delivery mass, and a device for framing a film, or any thereof, preferably in association with a movement control mechanism to be operated between a threading, normal exposing, locked exposing, single position exposing, or back winding position. An important object of this invention is to provide an improved light-trap which can be so operated, either tubular or single bladed, in the latter instance in combination with the improved gate structure hereof.

As stated in said co-pending Patent number 2,391,497, improved gate structure associated with the magazine as presented hereby may well be combined with control mechanism and film engaging and film moving means as stated therein. An important object therefore of the present invention is to provide improved elements of such combinations.

Another important object of this invention is to provide a light-trap for use in the combinations stated in said co-pending application now Patent Number 2,351,088 and operated by control mechanism described and claimed therein.

As previously stated, both of said co-pending parent applications describe and claim apparatus for alternative use with a film housed within a magazine and with one which is supported upon open reels. A magazine for such use should be one of the Ford-Morsbach type since it is positioned upon a magazine by a movement in a direction normal to the optical axis as is an open reel. The magazine described and claimed herein is ideal for such use since the section of the film exposed across the recess is properly protected. A most important object of this invention, therefore, is the provision of such a magazine with the film so protected for use in the apparatus of said co-pending applications.

Among the objects of this invention is the provision of the devices, mechanisms and combinations stated above. Other objects, advantages and characteristics will be evident from the following portion of this specification, the accompanying drawings and the subjoined claims. Although I am showing preferred forms only of my invention for purposes of illustration, it will be understood that changes can readily be made without departing from the scope of my broader claims or the spirit of my invention.

In the drawings:

Figure 1 is an isometric view of a camera, illustrated as generally of the Morsbach type, which embodies mechanism adapted to support and position that portion of the structure of my novel gate which is carried within a magazine and actuating mechanism thereof and for my novel light-trap.

Figure 2, likewise isometric, illustrates my novel magazine adapted for use with the gate structure of a type illustrated by Figure 1 and a light-trap of the single blade type which is operated by the control mechanism of Figures 1 and 6.

Figure 6 (sheet 2) is a vertical sectional view of a camera showing control mechanism for gate and light-trap and a connection interlocking such mechanism with means which block a pull-down. The gate illustrated therein is of the Morsbach type, which is used with my double or tubular light-trap, but control mechanism shown therein is equally applicable to my novel gate structure and either a double or single light-trap.

Figure 7 is a vertical section through a magazine showing my double or tubular light-trap in closed or protective position with a pin and cup control mechanism such as that illustrated in the preceding figures.

Figure 8 corresponds to Figure 7 but shows the parts in open or running position.

Figure 9 is an enlarged section taken on the line 9—9 of Figure 7 and looking in the direction of the arrows.

Figure 10 is an elevational view of a double or tubular light-trap of the type shown in Figures 7, 8 and 9.

Figure 11 corresponds to Figure 10 but shows an alternative form wherein a light-trap embodies both top and bottom edge guides for a film and is operated by a cup, or driven motion-transmitting member, of a form different from that shown in the preceding figures.

Figure 11A corresponds to Figures 10 and 11 and illustrates another modification of my tubular light-trap.

Figure 12:
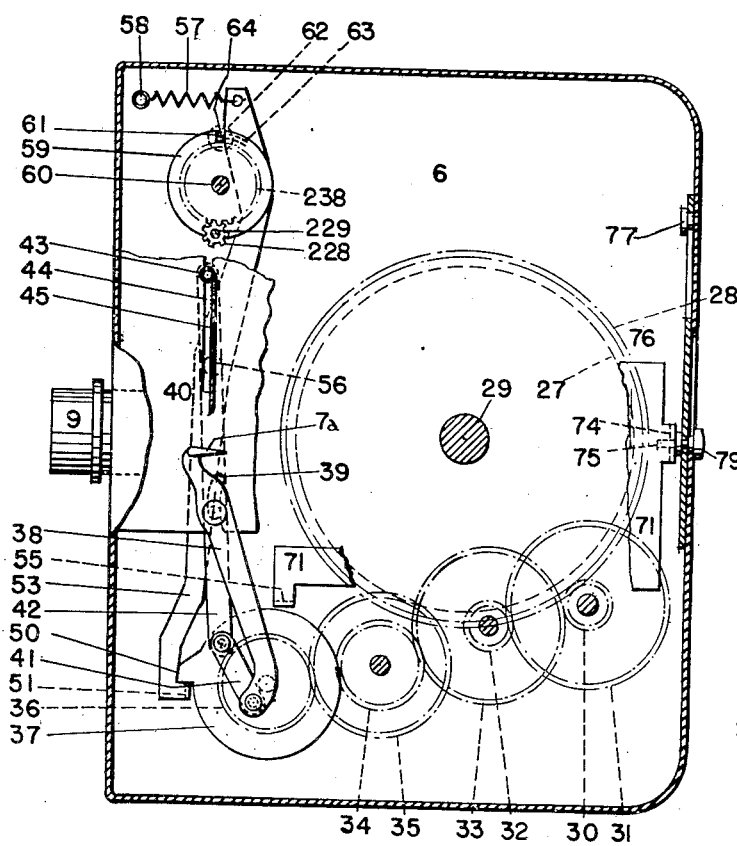

Figure 12, (sheet four) is a vertical sectional view through the mechanism chamber of a camera. It supplements Figure 6 by showing a pull-down and mechanism which drives and controls it and differs therefrom in that it shows a pinion and rack for operating a light-trap. This mechanism is shown as controlled by an actuating member which starts and stops the pull-down.

Figure 13 (sheet three) is a vertical sectional view through a camera showing my novel gate, a light-trap of my single bladed type, and rack and pinion control mechanism for operating either this light-trap or one of my tubular type.

Figure 14 is an enlarged detailed sectional view of control mechanism of my rack and pinion type, but compounded.

Figure 15 is an enlarged detailed view, largely in section, of a one-way clutch which I may apply to control mechanism for a light-trap which is operated by an actuating member for a pull-down or other feeding member of a camera.

Figure 16 is an enlarged plan view of a preferred construction of rack and pinion.

Figure 17 is a fragmentary sectional view corresponding to Figure 16.

Figure 18 is a detail of one form of latch for holding a light-trap in open position, this latch being mounted upon a magazine and movable to running position following the insertion of a magazine into a camera by the mechanism thereof and released by the first portion of the movement of the magazine out of the camera.

Figure 19 is a fragmentary view of a device attached to a tubular light-trap for moving a gate section away from a light-trap, this device not being necessary in the form of my invention wherein a one-way clutch of Figure 15 is employed.

Figure 20 is an enlarged sectional view, taken on the line 20—20 of Figure 21 and looking in the direction of the arrows, which illustrates a latch for a light-trap which I employ with the control mechanism which is actuated by a control button of a camera.

Figure 21 is a section taken on the line 21—21 of Figure 20 and looking in the direction of the arrows.

Figure 22:
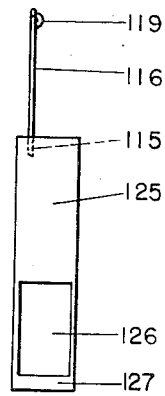

Figure 22 (sheet four) is an elevational view showing a light-trap of a single bladed form wherein an opening is provided in an otherwise opaque shield and the blade never completely withdrawn from across an exposure opening of a magazine.

Figure 2:
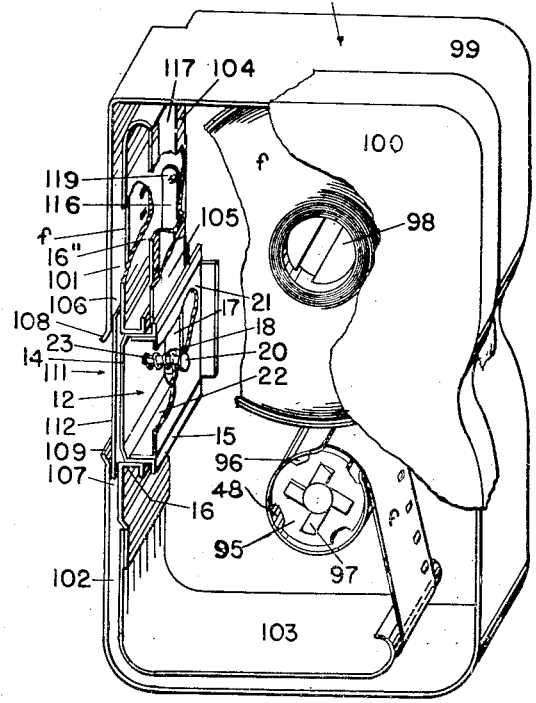
Figure 3:
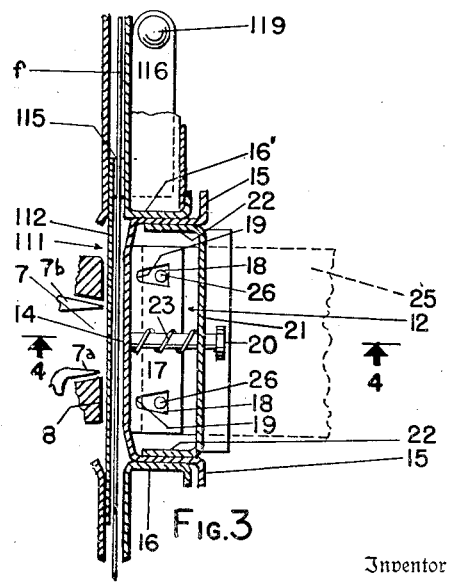
Figure 3 is an enlarged vertical sectional view of the light-trap and gate of the magazine and camera of Figures 1 and 2.
Figures 4, 23:
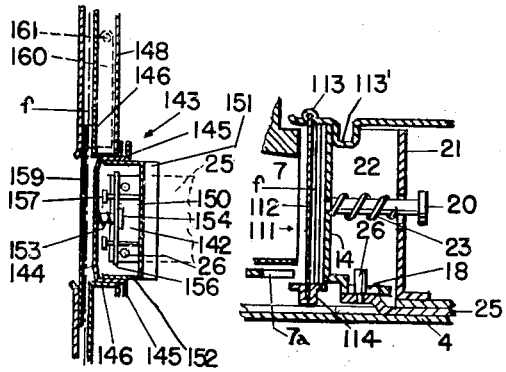
Figure 4 (sheet four) is a section taken on the lines 4—4 of Figures 3 and 13 and looking in the direction of the arrows.

Figure 23 (sheet four) is a view, largely in section, illustrating a movable gate section which is a modification of that shown in Figures 2 and 3.

Figures 24, 25 and 26 (sheet three) are views showing a modification of this invention wherein a movable gate structure is supported by a magazine and brought into exact focal plane by a camera and the spring tension for a subsequent pressing operation also furnished by the camera and not the magazine.

Figure 24 is a vertical section of the portion of such structure which is mounted in a magazine.

Figure 25 is an elevational view showing a bracket for use with the gate or presser structure of Figure 24, this bracket supplying the necessary resilience when the gate is closed.

Figure 26 is a section taken on the line 26—26 of Figure 25.

Figures 5, 27:
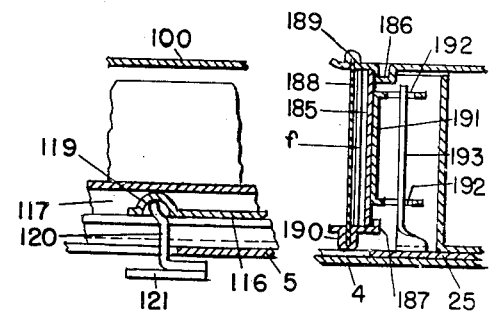
Figure 5 (sheet four) is a fragmentary section of a camera with a magazine in position therein which shows control mechanism for operating my light-trap, whether of the single blade or tubular type.
Figure 28:
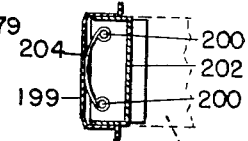
Figure 29:
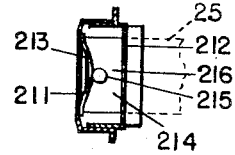

Figures 27, 28 and 29 (sheet four) illustrate important modifications of my invention in respect of resilient mountings for portions of a movable gate section which are supported by a magazine.

Figure 27 is a vertical section showing gate supporting pins which are themselves resilient mounted upon a movable gate bracket of a camera so that when the portion of a gate section supported by a magazine is brought into assembled relation with the camera and the gate closed by movement of the bracket resilience is imparted to a film presser member, subsequent movement of the gate bracket in the other direction to inoperative position rendering the gate inert, placing a light-trap in protective position and stopping the feed.

Figure 28 is a horizontal section showing somewhat similar structure whereby such resilience so furnished and withdrawn is supplied by a leaf spring extending between two supporting and positioning members which bear against the back of a presser member when the gate bracket is moved to operative position and withdrawn therefrom when the gate bracket is moved back to threading position.

Figure 29 corresponds to Figure 28 but shows such a leaf spring attached to a presser member and operated by contact with a single rigid positioning member mounted upon such a gate bracket and operated thereby.

In the following description, the point of view, except as noted, is that of a camera held in position to take pictures. That is, "forward" and words associated therewith indicate a direction toward an object being photographed and "backward" and words associated therewith indicate a contrary direction. The same words applied to a magazine assume the magazine to be in picture-taking position within a camera held as above stated. "Upward" and "downward" and words associated therewith likewise assume a camera or magazine to be in picture-taking position. "Inward" and "outward" are from the stand point of a film receiving compartment, "inward" being away from the cover and "outward" being toward the cover.

Other objects of my invention are to provide apparatus of the types and accomplishing the results described above and illustrated in the above drawings.

I illustrate my invention as applied to a film handling apparatus, in this instance a camera of the well-known and widely used Morsbach type, but of course its application is not so limited.

The camera may consist of a substantially rectangular casing 1 with a hinged cover 2, having a latching number 2¹, which closes a magazine receiving compartment 3 into which a user may insert a magazine M or M'. Within the casing are two bearing plates which make up a main frame, one 4 (Figure 6) which is disposed adjacent the floor 5 of the compartment and another 6 positioned within the interior of the casing. If desired, the plate 4 may also serve as the floor and a separate floor omitted.

A film f mounted within a magazine is drawn past an exposure window or aperture 7 by a claw 7a. This window is formed in a fixed gate plate or gate section 8 which projects backwardly from a lens 9 and into the film receiving compartment and defines the focal plane of the film. Location of this plane is highly critical. The distance between it and the lens must be established and maintained with very great accuracy since the focus of the instrument is determined thereby, as is well known to all skilled practitioners in this art.

My movable gate section consists of a plurality of cooperating members some mounted upon a magazine and some upon an apparatus but with those upon the apparatus operating and controlling those upon the magazine. As is clearly shown in Figures 1 and 3, upon the forward side of the magazine M and adjacent the inner portion of a closed recess 12 over which a film f passes I mount a main magazine gate plate generally indicated as 13 which comprises a forward portion or presser element 14 in actual engagement with a film, two lips or flanges 15 which extend backwardly therefrom and are disposed about the adjacent edges of two light trapping shields 16 and 16' and also a backwardly turned lip 17 which is positioned adjacent the bottom of the recess and parallel to its plane. This plate is preferably formed from one piece. This lip 17 includes two irregularly shaped openings 18 for coaction with a gate controlling and positioning mechanism which is disposed upon the camera. These openings are roughly triangular in shape with the apex of each in the form of an arc 19 positioned forwardly or relatively adjacent the film. This main plate although disposed within a magazine and supported inertly thereby when the magazine is not positioned within a camera is both actively supported and critically positioned by the camera when it is in assembled relation thereto. It may be so supported and controlled by the camera as shown in Figures 2, 3 and 4; or as shown in Figure 23; or 24, 25 and 26; or in 27; or 28; or 29; respectively, all as later described.

In the form of my invention shown in Figures 3, 4 and 5, a headed pin 20 is fixed to the side of the presser portion 14 of the gate opposite that engaging the film and extends backwardly and through an over sized opening in a supporting plate 21 and is freely movable relatively thereto. This plate is mounted upon the floor of the magazine M and extends away therefrom toward the cover thereof in a direction normal thereto. Lips 22 extend forwardly within the backwardly turned flanges 15 of the film contacting element thus protecting the film from light. Plate 13, it will be understood, is freely movable relatively to plate 21. A spring 23 coiled about pin 20 presses film contacting element 14 toward the film. Preferred shapes of these various elements will be clear from a consideration of Figures 2 and 3.

Devices to operate and control this gate section are disposed upon the camera. They include a gate supporting bracket 25 preferably but not necessarily formed with a forward portion 24 (Figure 6) slightly offset upwardly mounted in a suitable depression 25' in the floor of the magazine compartment and parallel to said floor and controlled by mechanism later described.

Mounted upon and extending outwardly from the forward preferably slightly raised end 24 of the plate 25 are two upstanding pins 26 the dimensions of which are such that they fit relatively snugly in the extreme forward portions 19 of the openings previously described but loosely within the rearward portions thereof. As a user drops the magazine into position within the camera the pins 26 irrespective of slight manufacturing inaccuracy or reasonable damage to the external portions of the magazine are positioned within the relatively large portions of the openings 18 relatively distant from the film. As the bracket 25 is moved forwardly toward gate closing position and closer to the film by means later described the pins 26 find their way into the rounded forward extremities 19 of the lip 17 thus accurately positioning the film contacting element 14 in relation to the apertured gate plate 8 which is fixed upon the apparatus. Plate 17, previously supported by the floor of the magazine now rests upon raised portion 24 of the bracket, in which, if desired, slight ridges not shown may be formed parallel to the optical axis to reduce frictional contact. Alternatively posts 26 may be formed with cross bars, not shown, upon which lip 17 may be supported when the magazine is in the camera. Thereupon the gate is closed ready for a film carried by the magazine to be fed therethrough.

Means for operating the pull-down claw 7a to feed a film through the gate will now be described.

Driving mechanism of the camera (see Figure 12) may consist of a coiled spring not shown housed within a cylindrical casing 27 which is mounted upon or attached to a driving gear 28. This spring is fixed to a shaft 29 and is wound by a handle not shown and held against unwanted unwinding by a ratchet and pawl or other suitable or conventional means not shown. Gear 28 meshes with and drives a gear 30 which is coaxial with and attached to gear 31. Gear 31 operates gear 32 with which gear 33 is movable. Gear 33 in turn meshes with gear 34 which is attached to and coaxial with gear 35 which through a gear 36 operates a movement driving disc 37 which is attached thereto.

This disc 37 drives the feeding claw or tooth 7a which intermittently feeds forwardly a film f, disposed in magazine M or M' which is placed within the camera. This claw is mounted on the end of a link 38 guided by a pin working in a curved slot 39 formed in an intermediate supporting plate 40. At its end opposite the tooth 7a the link 38 is pivotally connected to the free end of a short arm 41 which is mounted at its other end upon main driving disc 37. It will be seen that the revolution of disc 37 in a clockwise direction as shown in Figure 6 intermittently feeds the film forwardly.

A reciprocating shutter is driven in timed relation to the intermittent feeding member. A link 42 pivotally mounted upon the main driving disc 37 is guided at its upper end by means of a pin 43 working in a slot 44. Depending from this pin is a long shutter plate 45 with an opening not shown which in timed relation to the movement of the intermitten claw 7a alternately permits light from lens 9 to reach the film and cuts it off. This shutter is so timed that when the entire feeding mechanism is held inoperative between "shots" with the film at rest light can not reach the film. I may provide a positioning member or finger 7b which in any conventional or desired manner such as illustrated in said Morsbach Patent 2,175,538 may be driven from this mechanism.

A take-up member 48 revoluble with the gears 32 and 33 and hence driven by the spring winds up the film upon the take-up mass within the magazine. I may prefer to use a mechanism for releasably and frictionally coupling the member 48 to the coil within the magazine which is shown in the said patent to Morsbach et al. 2,175,538, but any desired or conventional means may be used.

To control the operation of the intermittent claw, shutter and take-up, the following mechanism may be employed.

Formed in the periphery of the driving disc 37 is projection 50 which is engageable with a dog 51 turned from the plane of the main portion of the lower end of control arm 53 and also with a dog 55 which is a part of the latching and control mechanism later described. This arm is pivotally mounted upon a stud 56 and held in position by a coiled spring 57 extending from the upper end of the arm to a pin 58 mounted upon plate 6.

Control mechanism for making a single exposure is not shown, but may be as shown in said Morsbach Patent 2,175,538 or in my United States Patent Number 2,206,032.

To operate the above control arm 53 and hence start and stop the film feeding mechanism, a disc 59 is provided. This disc is mounted for rotation upon a shaft 60 and moved between a running or feeding position by a short strut or arm 61 which extends into a notch 64 in disc 59 from a control button 62 which is mounted upon the exterior of the case, the arm 61 working in an arcuate slot 63. Spring 57 holds control arm 53 into engagement with arm 61. Thus as the button is moved in a clockwise direction as shown in Figure 12 and from the position there shown, arm 53 will be rocked and projection 50 removed from dog 51 and the apparatus started.

When the button is released, the spring will return the parts to the position shown in Figure 12 and the apparatus will be stopped.

Figure 1:
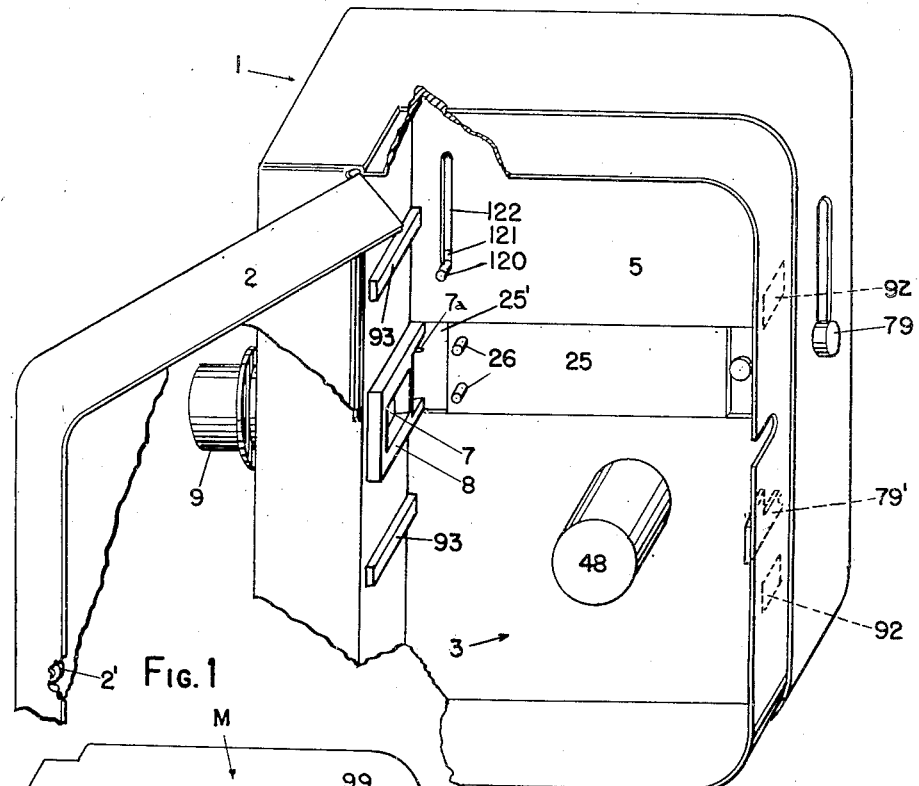

As previously pointed out, the complete unitary channels for the film comprises certain elements positioned upon the apparatus and others positioned upon the magazine. Film contacting surface 14, while a part of the movable gate section 13 which is loosely supported by the magazine, is finally supported and positioned by the camera and moved into and away from its critical operative position by bracket 25. The magazine is dropped into place while this slide is in open or film threading position as shown in Figure 1. At this time after the magazine has been dropped into place but before the gate has been closed pins 26 are in the position shown in Figure 3 and the film has not been brought into the focal plane and is not under pressure from the film contacting surface of the presser plate. Thereafter the cover is closed and latched and by mechanism later described the slide moved forwardly so that pins 26 move into the arcuate forward extremities of their openings and the whole movable gate section is brought into running position. Spring 23, which is relatively very light, permits sufficient movement of the presser-plate to accommodate irregularities during the running of the film while maintaining the film pressed into critical relation to the focal plane in a manner generally considered necessary in this art. The unlatching of the cover of the apparatus, however, moves the gate supporting plate 25 backwardly to the position shown in Figure 1, releases the pressure upon the film and permits the easy removal of the magazine from the apparatus. At this time, the film and the light-trap then associated therewith clear the fixed gate section and sufficient space is provided so that a light-trap has opportunity to operate whenever needed without conflict.

Except at such times as the gate is completely closed it is impossible to feed a film. As will be clear from Figures 6 and 12, the main driving disc 37 will be held immovable by engagement of the projection 50 by the dog 55 which is turned in the lower end of a control plate 71 if an attempt is made to start a feeding operation while the cover 2 is open and unlatched. As shown in these figures, the film moving mechanism is held immovable by other and associated control devices which are used to stop and start a feeding operation of the film, as is later described in detail. If, however, while the disc 37 is free to revolve under the power of the spring as in a feeding operation, the cover is opened, projection 50 will be engaged by dog 55 before the feeding mechanism is permitted more than a small fractional portion of its revolution. At that time the parts will be in a position shown by Figure 2 of the said Morsbach Patent 2,175,538. It will, therefore, be seen that the movement of this control plate upwardly as viewed in the figures permits the film feeding mechanism to operate and that its movement therefrom to a downward position will block this feeding mechanism.

This control plate is guided by a pin 72 operating in a slot 73, as will clearly be seen from Figure 6. Right-angled projection 74 struck in plate 71 coacts with a pin 75 mounted upon a latch control slide 76 guided by pins 77 projecting forwardly toward the interior of the camera from the back wall of the film receiving compartment and controlled by a wire spring 78. A button 79 extending to a point exterior of the camera for easy operation by a finger of a user operates the slide to which is attached a latch 79[1] for cooperation with member 2[1] on the cover.

Figure 6 illustrates a movable gate section 80 of the Morsbach type mounted upon a forward and upturned portion of slide or gate cover bracket 25 but whether a gate member of this type or my novel supporting mechanism is employed, the construction and operation of the slide may be unchanged, except in certain variants of my invention later described in detail. This bracket 25 may be guided by pins 81 and 82 working in slots 83 and 84 respectively. The pin 82 projects downwardly from this carrier bracket and engages slot 85 cut in control plate 71. An upward portion of the slot is straight while the lower portion is offset in order to form a camming surface. Thus a movement of the latch upwardly from the position shown in Figure 6 will force the carrier bracket forwardly so that the movable pressure plate or contacting surface 14 is brought against the fixed apertured plate 8 and the dog 55 removed from alignment with the projection 56 permitting the operation of the feeding mechanism. Thus the gate is closed and the operation of the camera permitted.

To assist in the proper positioning of the magazine within its compartment, a spring not shown is disposed upon the cover 2 and leaf springs 92 upon the back wall of the compartment. Also small positioning blocks or projections 93 may extend backwardly from the front wall of the compartment or, alternatively, forwardly facing projections 302 (Figure 7) may be added to the forward edge of the magazine. As a result, the magazine, after it has been placed in position in its compartment and the cover closed, is forced into and maintained in operating position. The blocks or projections are effective to hold the magazine away from the front wall so that a light-trap and the inwardly projecting gate section 8 will clear each other as a magazine is being placed in or removed from operating relation to the apparatus.

A latching member 2' (Figure 1) provided upon the cover member 2 upon the closing thereof engages a corresponding member 79' mounted upon the slide 76 which is operated by the latch button 79. Thus when the cover is closed it is latched into position by the same movement of button 79 which releases the driving mechanism and moves the gate member into position, thus bringing the film into the focal plane, and, as later described in detail, retracts a light shield. On the contrary by the release of the latch the bracket and gate member carried thereby are moved backwardly, the channel at that point is widened, and the mechanism for feeding the film through the channel is rendered inoperative. Also, the light shield is brought back to protective position.

It will be noted that the upper portion of operating slot 85 is relatively long. Thus the latch button is permitted considerable movement before the gate is closed and after it is opened. As a consequence time is given for the operation of a light-trap, as later described, in the necessary sequential relation to the operation of the gate.

Having now described my novel gate structure, part of which is carried by the magazine in a closed recess but operated by the apparatus, I shall next explain the application of my single bladed light-trap to such a magazine and its sequential operation with a further description of those other parts of the magazine which are necessary to a full understanding of the light-trap. Thereafter, I shall describe certain preferred modifications of my novel magazine gate structure and involving a magazine and a camera together with a light-trapping structure for use therewith. Thereafter, I shall fully explain my novel tubular light-trap which I illustrate as applied to a Ford-Morsbach magazine with an open recess and operate in a manner similar to that in which I operate my single bladed light-trap.

As stated in the introductory portion of the specification, I may apply a single bladed light-trap to my novel magazine M which substitutes a closed recess for the open gate receiving recess of the Ford-Morsbach magazine. In this instance the closed recess which includes a portion of the gate, all as previously described, protects the rear side of the film from light and my single bladed light-trap protects the forward side. I may apply my tubular light-trap, however, to a magazine M' of the Morsbach type which is an improvement over the Ford magazine. Since the recess of this magazine is entirely open to light except upon the upward side it is necessary that I surround all sides of the film with a light protecting element. The control mechanism per se by which I operate each of these two different light-traps is substantially the same.

The parts of magazine M which are associated with my light-trap will now be described.

A film f supported within this magazine is wound upon a take-up hub 95. Inwardly struck depressions 96 cooperate with take-up spindle 48 of the camera in a manner previously indicated. As in said Morsbach Patent 2,175,538, projections 97 struck upwardly in this hub cooperate with a spring not shown to prevent unwanted unwinding of this hub. The film passes to this take-up mechanism from a delivery spindle 98 supported upon the floor of the bottom element or main body 99 of the magazine. A cover 100 is provided therefor. A delivery channel 101 leads from the delivery coil to a closed gate receiving recess 12 while a take-up channel 102 leads therefrom toward the take-up assembly. This take-up channel is bounded upon the side toward the interior of the magazine by L-shaped plate 16 previously described to the depending leg of which is attached a channel forming and tensioning member 103 of the Bundick and Proctor type. The delivery channel is bounded upon its rearward side by the upstanding leg of L-shaped plate 16'. Still further backwardly a plate 104 is provided parallel thereto which acts as a guide and light baffling member for the operating mechanism for my light-trap hereinafter described and also as a support for a delivery tensioning member 105 of the Bundick and Proctor type shown in Figure 2 only in fragmentary form but fully shown in Figure 7 as 312.

Delivery channel 101 terminates in a mouth or aperture 106 above recess 12 while take-up channel 102 starts in a similar mouth or aperture 107 below this recess and in alignment with mouth 106. The forward walls of both body and cover of the magazine are flared forwardly at 108 and 109 respectively to accommodate more readily the slight forward bend which is given to the film when it is pressed forwardly into relation with fixed gate member 8, after the light-trap generally indicated as 111 has been removed from protective position.

This single bladed light-trap consists essentially of a single thin sheet 112 positioned within a magazine and movable between a first or light obscuring or protective or threading position wherein it extends across the recess 12 in the magazine M and between it and its forwardly facing opening and a second or operative or running position wherein it is retracted to a position completely within the body of the magazine and frees the film for exposure to light and for engagement with a pull-down claw and, if desired, positioning claw. As shown, this single blade is disposed directly between the film and the forward edge of the film path but it may be placed in a flat pocket formed between a thin plate with an opening which defines the aperture and a prtion of the wall of the magazine, this plate having a central portion offset from its edges for the reception of the blade and the edges being attached to the wall. As shown in Figure 4, however, I may prefer to guide this shutter by a depression or groove 113 stamped or otherwise formed in the cover of the magazine and a depression or groove 114 similarly formed opposite thereto in the floor of the body of the magazine. A light trapping groove 113' serves also to guide gate member 14 and to limit its rearward or rightward movement.

To move this light obscuring blade, I prefer to attach to the upper end thereof a rightangled extension 115 which after passing between an edge of the film track and the adjacent or bottom wall of the magazine is attached to or formed integrally with an upwardly extending slide 116 working in and guided by a depression or channel 117 formed in the floor of the film magazine. At its extreme point, this slide carries a control cup, or driven motion transmitting member 119 which when the magazine is within the camera embraces an upstanding pin 120 attached to a control slide 121 which extends from and is attached to latching slide 76 which is operated by control button 79. This pin may be made slightly resilient to accommodate slight irregularities in the magazine caused by manufacturing or use. This pin works in a slot 121 cut in the floor 5 of the magazine receiving compartment and in plate 4. Straps, not shown, guide slide 121 for motion in a plane parallel to plate 4 and adjacent its under surface. Hence movement of this latch will operate the light-trap.

The light-trap just described is illustrated in Figures 2, 3, 4, 13 and 23. A modification is shown in Figure 22 (sheet four). In Figure 22 a light obscuring plate 125 corresponds to plate 112 but is relatively much longer and contains an opening 126. It is so disposed in a magazine that when the light-trap is in first or protective position, the opaque portion is situated opposite the opening of the recess but when it is moved upwardly to second or exposing position the opening 126 is so placed. The lower end 127 of the plate remains within the take-up channel of the magazine at all times.

The operation of this light-trap is clear from the immediately foregoing portion of this specification. A user by a movement in a direction normal to the optical axis of magazine and apparatus places a magazine, such as has been described, in its compartment 3, manually closes the cover and by an upward movement of latching button 79 latches it shut. This latching operation moves link 121 moving pin 120 upwardly in slot 122. Through cup 119 and slide 116 this operation moves light trapping blade 112 (or 116) from obscuring or protective relation to magazine opening 111 and frees the film for exposure and feeding. During this operation the movable gate section 14 remains motionless. After the light-trap, however, has been moved upwardly clear of the opening, pins 26 move forwardly within openings 18 finally engaging their forward ends 19 and thereupon move the portion of the gate section which is carried by the magazine into closed or running position. Therefore, it will be seen that this latching movement of the cover will be effective first to open the light-trap and thereafter to close the gate. As section 14 presses against the film $f$ it moves it toward fixed gate section 8 and into engagement therewith, thus slightly displacing the film from its straight path between delivery mouth 106 and take-up mouth 107, the operational path therefore being disposed slightly forwardly or toward the lens from the threading path shown in Figures 2, 3 and 4. If a careless user tries to start the feeding operation, projection 55 blocks dog 50 which is sufficiently elongated to remain in alignment until the light-trap has cleared the path of both claws.

Contrary movement of latch 79 from the latched to the unlatched position which is prerequisite to the opening of the cover will first be effective for opening the gate by drawing plate 14 away from fixed apertured section 8 and will thereafter move the light-trap from exposure position back to protective position and will block the pulldown. Sequence is enforced so that there can be no conflict.

A movable gate structure such as illustrated in Figure 23 may be employed instead of that illustrated in Figures 2 and 3 and previously described. In this modification, a presser member is subjected to no pressure whatever until a supporting gate bracket has brought it into running position.

As in the construction previously described, adjacent the inner portion of a closed recess of a magazine over which a film passes is that portion of a movable gate section generally indicated as 143 which is carried by the magazine. It comprises mounting means similar to those previously described and a forward portion or presser member 144 in actual engagement with the film when the magazine is in operative position and two inwardly turned lips or flanges 145 which extend backwardly therefrom and then upwardly and about the inner edges of a light trapping shield 146 and a supporting and baffling plate 149 which corresponds to plate 311 of Figures 7, 8 and 9 later described in detail.

A supporting plate 150 forming the back portion of the gate recess has a supporting flange 151 which extends backwardly adjacent the floor of the magazine and parallel and attached thereto. It also is formed with light baffling flanges 152 which extend forwardly within the backwardly extending flanges 145 of the presser plate. Thus an effective closure is formed. A spring 153 is coiled about a headed pin 154 which is fixedly mounted in presser member 144 and extends backwardly toward the main portion of supporting plate 150 but is not connected thereto. An operating cross plate 156 for spring 153 is loosely mounted upon two headed guide pins 157 which are mounted upon this supporting plate and extend forwardly therefrom. Pin 154 passes through a central opening in this cross bar but out of contact therewith. Control pins 26, such as previously illustrated and described, extend upwardly from a gate control bracket 25 and are so disposed that when they are brought forwardly by a gate closing movement of gate bracket 25 they are pressed into engagment with the cross plate and when the bracket 25 is moved forwardly press the film into engagement with a fixed apertured gate plate such as 8, not shown in Figure 23.

A single bladed light-trap such as previously described is applied to this gate structure and its associated parts. A blade 159 is operated by an offset and upwardly extending portion 160 having a socket or cup 161 for the reception of light-trap operating pin 120 all as previously described.

By reason of the above construction, it will be seen that when a magazine embodying these movable gate devices is placed in assembled relation with a camera such as previously described and the control mechanism is moved toward running position by operation of latch 79 pin 120 first moves the light-trap to operating position, thereby freeing the film, and thereafter moves control pins 26 against cross plate 156 thereby both forcing the film contacting plate against the film and also applying tension to spring 153. Similarly movement of the latch to open position will first separate the gate plates thereby releasing all pressure upon the movable film-contacting member and moving it away from the film and thereafter will move the light-trap to its protective position. Thus it will be seen that the application of spring tension to the film as well as all other functions related to the operative positioning of the film in the apparatus is controlled entirely by the camera.

As is clearly shown in Figures 24, 25 and 26 a movable gate section generally indicated as 163 is disposed in part upon the magazine but in all respects controlled positioned and tensioned by the camera. A forward film contacting portion or presser member 164 engages the film and forms a front wall of a closed recess 162 of a magazine. Two lips or flanges 165 extend backwardly from this presser member and cooperate with the adjacent edges of two light trapping shields 166 to shield the film from light. A lip or flange 167 extends parallel to the floor of the magazine and includes two irregularly shaped openings 168 similar to 18 for coaction with that portion of the gate controlling tensioning and positioning mechanism which is mounted upon the camera.

To hold this presser member generally in position while the magazine is out of the camera and until the cooperating mechanism of the camera is applied to it, two headed pins 169 project backwardly from presser member 164 and through over size openings in a supporting plate 171 mounted upon the floor of the magazine and having flanges 172 which extend forwardly within the backwardly turned flanges 165 of the film contacting member thus further protecting the film from light. These pins freely move through the support, their only function being to hold the presser member in its approximate position so that it can be engaged and operated by the mechanism of the camera.

A gate supporting duplex bracket generally indicated as 173 is mounted upon the apparatus within an appropriate slot cut in the floor 5 of a magazine receiving compartment and generally controlled in a manner similar to that applied to gate bracket 25 which it resembles in many particulars.

A bracket plate 174 of this duplex bracket is controlled by pins not shown which are operated as by a plate 71 as previously fully described.

Mounted upon this main bracket plate for bodily movement therewith and resilient movement relatively thereto is a supporting plate 175 from a forward and slightly elevated portion of which extend pins 176 which coact with openings 168 in the manner previously described in connection with pins 26 and openings 18. After the magazine has been put into position, it will be understood that the presser member rests upon the forward elevated portion of the gate bracket. Support 175 moves within an appropriate slot 177 cut within the main bracket plate, cooperatingly bevelled edges permitting movement along the longitudinal axis of these parts but keeping the parts in assembled relation and serving as guiding means. A coiled tension spring 178 passes between a pin 179 fixed to main plate 174 and a pin 180 fixed to the support 175, appropriate slots being provided in bearing plate 4. The spring tends to move the support forwardly or to the left as shown in Figure 24.

By reason of the above construction, when a magazine containing the gate structure of these figures is placed in position in its compartment, bracket 173 as a whole being in the threading position with pins 176 disposed relatively far back from the fixed gate, the pins enter the openings provided therefor. Then, a user closes the cover and moves the latch to locked position. First, the light-trap is removed and thereafter the movable gate section is brought into operative relation to the fixed gate section and for the first time and by instrumentalities carried by the camera the film is subjected to pressure.

Figure 27 (sheet four) shows modifications, in somewhat more simple form, of the structure of Figures 24, 25 and 26 wherein these portions of the movable gate section which are carried by a magazine are furnished resilience as well as positioned by two upstanding resilient pins mounted upon a gate bracket such as previously described.

A presser member 185, constructed similarly to those previously described, is positioned adjacent the forward side of a closed recess of a magazine and held in approximate position by a depression 186 and a flange 187, which also serve as light baffles, which extend inwardly toward the body of the magazine from its cover and floor respectively. Forwardly of this member is a film f and forwardly of that a single bladed light-trap 188 guided at the top by a groove 189 extending upwardly within a cover of the magazine and at the bottom by a groove 190 extending downwardly from the floor of the magazine. Operation of this light-trap per se and in sequential relation to the operation of the other operable parts of the apparatus may be carried out as previously stated.

Attached to this presser member and extending rearwardly therefrom is a U-shaped bracket indicated as 191, the arms being parallel to the floor of the magazine as well as to each other. Openings 192, generally similar to openings 18 previously described, when the magazine is in the apparatus receive resilient positioning posts 193 which extend upwardly from a bracket plate 25 constructed and operated as those previously described. Thus when a magazine is in assembled relation to a camera as gate plate 25 has been operated these posts not only bring into operative relation those parts of the movable gate section which are disposed upon a magazine but also furnish the resilience which is needed for operation.

Other parts, largely supporting and light baffling, which closely resemble those elsewhere described in detail, need not be mentioned.

The structure of Figure 28 (sheet four) accomplishes similar results entirely by the camera. A portion of a movable gate section supported by a magazine includes a presser surface 199 with supporting and light baffling structures associated therewith which closely resemble those previously described in detail. Two operating posts 200 are provided in a gate bracket 25 similar in construction and operation to those previously described and so disposed that when a magazine is placed in the apparatus they will enter a closed recess the front of which is defined by presser member 199 and the back of which is defined by a support 202 fixed upon the floor of a magazine and extending upwardly therefrom. A leaf spring 204 extends between these posts and is solely supported thereby. When the magazine of this type is placed within its compartment spring 204 is disposed within the closed recess and out of contact with its bounding surfaces and when the magazine is brought to operative position by the closing of the gate bracket the parts are disposed as in Figure 22 and the spring bears against the rear of the presser member thus forcing its film contacting surface against the film and a fixed gate section such as 8 and both positioning the film and furnishing the resilience necessary for proper operation.

The modification of the foregoing structure shown in Figure 29 chiefly differs from that illustrated in Figure 28 in that the member furnishing the resilience is always disposed within the closed recess of the magazine but is inert and not made effective until the introduction of the magazine within its compartment and the closing of the gate bracket, which of course follows the withdrawal of a light shield and precedes the actuation of a film feeding mechanism.

A presser member 211 such as those previously described with a forwardly facing film contacting surface and two backwardly extending supporting and light baffling flanges is supported as previously stated opposite to a supporting plate 212. A single leaf spring 213 is attached to the rear surface of this presser member and extends backwardly into a closed recess 214 which is created by presser member 211 and support 212. A single operating post 215 extends upwardly from a movable gate bracket 216 which is otherwise constructed and is operated as previously described in connection with bracket 25. When a magazine containing this structure is placed into position in its compartment the post 215 is first disposed in recess 214 out of contact with all parts upon the magazine. As the gate bracket is moved toward its operating station, post 215 engages the rearward surface of spring 213 and upon continued movement of the bracket moves the gate member into its operative position as shown in Figure 29 and furnishes the resilience necessary for proper operation.

If desired, in the structures of Figures 28 and 29 the presser members may have flanges which extend backwardly parallel to the floor of the magazine but adjacent the openings through which the operating parts of the magazine enter the respective recesses. Thereupon the forward (and slightly narrowed) and elevated portions of brackets 25 will engage these flanges and support the respective presser members. In the construction as shown, the presser members are supported by contact between the floor of the magazines and their backwardly extending flanges.

It will be understood by those skilled in this art that all surfaces engaging an image-bearing portion of the film are suitably relieved to prevent scratching.

It will also be understood that by "closed recess" as used in this description and in the claims, I mean an area which is enclosed upon all sides which affect the film. The inner side—that is the one adjacent the floor of the magazine and generally in alignment with the floor of the magazine—is necessarily open in part to receive the parts of the gate and its mechanism which are carried by the apparatus. For convenience, I have shown the various members which form the recess as in contact, but as a matter of fact they are somewhat loose fitting since relatively free movement is desirable. Light is baffled for the most part by angular formations. In connection with these and related parts, I use the word "plates." This term does not imply weight or bulk, for almost all of these parts are made of light but stiff sheet metal.

The previous detailed portions of this specification have described a light-trap of my novel single bladed type as being moved between protective and running positions by interlocked relation with a latch for a cover. Also, the light-traps of this application may be operated directly by the cover, as described and claimed in the said parent application now Patent Number 2,391,497, dated December 25, 1945, of Oliver Whitwell Wilson and myself. As previously stated such a control mechanism can be applied equally well to my novel tubular light-trap. I shall now first describe another type of control mechanism for a light-trap and first apply such mechanism to a light-trap of a single bladed type although it is equally applicable to either form.

Control mechanism for a light-trap, which I am about to describe, is actuated to move a light-trap from protective to running position by the starting of the feed of the camera. The light-trap thereupon is moved back to protective position from such running position either by the stopping of the operation of the feed of the camera or preferably by the removal of the magazine from its compartment within a camera.

As previously described, I may attach to the upper portion of a light-trap formed by a single blade 221 as shown in Figure 13 by an offset connection 222 a slide 223, these parts corresponding to those previously described in connection with Figures 2 and 3 and indicated by reference characters 112, 115 and 116 respectively.

This slide works in a guiding depression 224. In this upwardly extending slide, however, teeth 227 are cut for cooperation with teeth cut in a driving pinion 228 revolvable upon a short shaft 229. The rack so formed extends forwardly below the lower edge of the film and is exposed along the front face of the magazine for engagement by pinion 228. This pinion and the rack driven thereby correspond to the pin and cup construction previously described. A spring 230 extending between a bracket 231 in the side of guiding depression 224 and a pin 232 extending from this slide tend to move the slide downwardly and hence to move the light-trap from free or running position to protective or threading position. See Figure 21. In order to prevent a possible conflict between the teeth of the rack and those of the pinion when the magazine is placed in operative relation with the camera and these teeth first engage, the teeth 233 and 234 of pinion or rack, respectively, or of both may be bevelled at the cooperating edges as is shown in fragmentary enlarged detailed in Figures 16 and 17. Alternatively the rack bar may be so mounted that it is capable of a slight resilient inward movement toward the center of the film compartment as the magazine is placed in the compartment which received it. The light obscuring shutter or blade, its offset portion and the slide or rack may all be formed of one piece, as will be readily apparent. Such movement may be supplied by the making of the shutter which is operated by the rack bar of resilient metal or alternatively by connecting the rack bar and the the shutter or light-trap which it operates by a leaf spring. Very little movement is all that is required, if any. As will best be understood by reference to Figure 21 and for coaction with a latch later to be described in detail, I may prefer to form the upper portion of this slide or rack bar with a fixed latching head 235 separated from the teeth of the rack bar by a small flat 236.

As is shown in Figures 12 and 13 movement is communicated to pinion 228 by gear 238 attached to shaft 60 and rotatable therewith and with disc 59 following movement of strut 61 by control button 62, as has been previously described. As gear 238 is so rotated pinion 228 is also rotated to drive rack 227 to move the light obstructing blade of the trap from protective to running position. Such movement also rocks the top of control lever 53 backwardly or toward the right as shown in Figures 12 and 15 thereby removing dog 51 from projection 50 and starting a feeding operation. It will be understood that while movement is immediately communicated to the trap so that its lower end clears the position to be occupied by the claws movement is not communicated to these claws until the dog and projection are completely separated. Thus, there is no conflict between claws and light-trap even in the relatively simple form of the invention shown in Figure 13.

I prefer, however, to provide mechanism which relatively very quickly completes this retraction of the light-trap. To that end, as is shown in Figure 14, I compound this movement. I drive a toothed rack 241 by a pinion 242 corresponding to pinion 228 and similarly driven. This rack drives a pinion 243 which engages a toothed rack 244 generally corresponding to that previously described, rack 241 having teeth formed on both sides. It will therefore be understood that this construction much increases the speed of movement of the light-trap from protective to running position.

As previously stated, I may mount my single bladed light-trap out of direct contact with the film in a guiding socket or pocket between the film and the front of the magazine, but for simplicity I am showing this single bladed light-trap as positioned adjacent the film and guided by the previously described depressions in the magazine cover and floor.

According to the construction just described, the light-trap is placed in light obscuring or protecting relation to the film every time the exposure of the film is stopped and removed therefrom every time the exposing operation is started, whether or not the magazine is removed from the camera. This arrangement calls for much movement and the passage of the light-trapping element between the fixed gate section and the film between each "shot." The gate structure previously described has sufficient resilience to permit such movement without harm. To avoid such movement, however, I much prefer to move the light-trap to running position as described above but then to latch it in that open position until the magazine is removed from the camera, the act of such removal being effective automatically to release such latch and thereupon to permit spring 239 to return the light-trap to protective position.

To this end I transmit the motion of control button 62 only in one direction—namely that of starting the operation of the apparatus—by a one-way clutch of the familiar ball and wedge type. As is shown in Figure 15, a control disc 251 is attached to shaft 60'. Coaxial with disc 251 and movable therewith is a control disc 252 into which two wedge shaped openings 253 are cut, balls 254 being placed therein. Attached to and driven by this disc or formed therewith is a gear 255 which meshes with a pinion 257 corresponding to pinions 228 and 242 previously described. By reason of this construction it will be evident that the motion of control disc 251 will be communicated to the light-trap only when the control button is moved to start the apparatus and disc 252 rotated in a clockwise direction, contrary movement to stop the feed having no effect upon gear 255 and hence upon the light-trap.

In order to latch the light-trap in running or free position after it has been moved thereto as described above, I may employ the latch of Figures 20 and 21 or that of Figure 18.

The latch of Figures 20 and 21 which is generally indicated as 261 consists essentially of a retaining pin 262, a releasing pin 263 and spring operated linkage connecting the two all mounted upon a supporting plate 264 which extends forwardly from a portion 265 of a front wall of a magazine receiving compartment. Retaining pin 262 is L-shaped, the long leg of the L sliding upon floor 5 of the magazine receiving compartment and the short upstanding leg being adapted to cooperate with a locking tooth 235 which as previously described is formed in the upper end of rack 223. After the mechanism previously described has been operated by the movement of the control button to feeding position latch 235 and retaining pin 262 are moved together and locked in position to hold the light-trap open and in running position.

Retaining pin 262 by pin and slot connection generally indicated as 267 is attached to and operated by link 268 pivoted at 269 to plate 264. This link likewise by pin and slot connection 270 is connected to and operated by a link 271 likewise pivoted by a pin 272 to plate 264. By another pin and slot connection 274 link 271 is attached to releasing pin 263 for operation therewith. Means not shown are provided to guide members 262 and 263. A spring 276 extending from pin 270 to a bracket 278 conveniently placed in a portion 279 of the front wall of a camera tends to pull the center point of this linkage forwardly and the retaining and releasing pins backwardly or into latching position. A camming formation 280 is placed on a forward upper edge of a cover of a magazine M.

By reason of the above construction it will be evident that after a magazine has been placed in position and control button 62 moved to start a feeding operation locking tooth 235 upon rack 227 will press locking pin 262 forwardly against pressure of coiled spring 276 which will thereupon lock these two members in latching engagement with each other. As control button 62 is moved in counter clockwise direction to stop the feeding operation, this movement will not be communicated to the rack because of the one-way clutch of Figure 15. When, however, the magazine is removed from its compartment camming surface 280 will engage releasing pin 263 and through pin and slot connection 274 immediately move locking pin 262 forwardly and away from engagement with locking tooth 235 thereby permitting spring 230 immediately to snap the light-trap to protective position. Spring 276 will return the latch to the position of Figure 20 ready for further operation. It will, of course, be understood that at this time the gate will necessarily be opened by the unlatching of the magazine cover and the feeding mechanism locked motionless.

Alternatively, I may make use of a latching structure such as that which is shown in Figure 18. A bottom wall 290 of a magazine such as M or M' is formed with a small suitably light-trapped opening 291 across which extends a latching leaf spring 292 formed with a retaining head 293. In the right hand extremity of rack 294, which except as to this latching mechanism corresponds to rack 244 previously described, a cooperating latching or retaining head 295 is formed.

By reason of this construction it will be evident that when the magazine is placed in the apparatus retaining latching head 295 will be positioned for engagement by retaining head 293. As soon as rack 294 is moved to operative position by the mechanism previously described in connection with toothed rack 244 these members will snap together and the rack will be held until the removal of the magazine from its compartment removes the tension from spring 292 and thereby disengages the cooperating formations 293 and 295 thereby permitting a spring such as 230 immediately to snap the light-trap to protective position.

As stated in the introductory portion of this specification and in the detailed description previously presented, I may utilize the same mechanism for operating either my single bladed light-trap previously described or my tubular or double bladed light-trap which I am about to describe. An essential difference between the structure presented hereinabove and that making use of my tubular light-trap, however, is that in this instance both magazine and camera more closely approach the Morsbach type, the chief points of novelty residing in the tubular light-trap and control mechanism therefor. In both instances, I support and critically position a presser member by mechanism carried by a camera. In the former case, in which a single bladed light-trap is used, I employ my novel magazine which is characterized by a closed recess which itself protects the back of the film from light. In the second case, I use the Morsbach-Ford magazine which is characterized by an open recess and I must therefore provide a light-trap which completely surrounds the section of film which is exposed across the recess when the magazine is out of a camera. In the second case a presser member is mounted upon a camera upon or adjacent the forward edge of a movable gate bracket in such relation to a film receiving compartment that when a magazine is positioned therein it extends into the open gate-receiving recess and between the film and the body of the magazine and is disposed opposite a backwardly facing apertured gate member. When the light trapping tube which is necessary with such a gate is in a first or protective or threading position it is disposed across the gate receiving recess of the magazine and completely surrounds the film. It is then withdrawn from this protective relation to the film to a second or running or exposing position wherein it is disposed within the body of the magazine.

As previously made clear the film is held during its exposure exactly in the focal plane of the lens as is necessary for proper results. It is so held by mechanism which is critically positioned by the apparatus. An apertured member which establishes and closely maintains this plane therefore must project backwardly from the lens and into contact with the film. It is evident that this tubular member which for light trapping purposes must completely surround the film must be so disposed that it does not conflict at any time with an apertured member which defines the focal plane nor with a presser member which holds the film thereagainst. Moreover it should be made impossible for a careless user to start a feeding movement while the light-trap lies across the recess opposite the feeding members. Means to accomplish the latter of these ends have already been described.

I prefer to prevent this conflict by spacing the magazine so that the length of film stretching across the open recess and surrounded by the light-trap is disposed sufficiently to the rear of a fixed gate section so that when the light-trap is in position it clears the fixed gate section. The movable gate section is disposed a still greater distance to the rear and between light trapping tube and the back of the recess. Thereupon, after the light-trap has been removed from protective position, the gate closing operation causes a presser member to bring the film forwardly toward the lens and into engagement with the fixed gate member. When the light-trap is again returned to closed position it moves the film backwardly a few thousandths of an inch as is necessary to permit this clearance when the magazine with the light-trap in position is removed. It will be seen, therefore, that the operational path of a film through the camera is moved slightly forwardly toward the lens from a straight line between the mouths of the channels which lead the film from and to the gate receiving recess. The threading path of the film, however, is a straight line extending between opposite mouths of the delivery and take-up channels respectively and surrounded by the tubular light-trap.

As previously stated I apply this structure to a magazine M' of the Morsbach type. Further details of this magazine will be observed from Figure 2 hereof and from the said Morsbach Patent 2,175,538 Figure 6 thereof.

As shown in Figures 7 and 8 hereof in a front wall 300 of a magazine M' an open recess 301 is provided over which a film $f$ passes. As will be seen from Figure 6 a movable gate or presser member 80 already described is resiliently mounted upon the forward upturned end of movable gate bracket 25. Spacing members 302 may extend forwardly from the magazine to engage the front wall of the compartment 3 to hold the magazine slightly away therefrom so that the light-trap will clear the backwardly facing apertured gate section 8 when the magazine is in position in the camera. Alternatively similar spacing formations 93 already described may extend backwardly from the front wall of the magazine-receiving compartment of the camera. This spacing of the forward portion of the magazine away from the front wall of the compartment is slight and not at all critical. All that is necessary is to afford the above noted clearance between light-trap and fixed gate section, the final and critical positioning always depending upon members disposed upon and wholly controlled by the apparatus.

A delivery channel 303 leads from a delivery mass of the film not shown to the gate receiving recess and terminates in a delivery mouth 304 having a slightly flared front edge 305 so as to cause no conflict with the film as it is brought forwardly into engagement with the fixed gate section of the camera. A similar take-up channel 306 aligned with channel 305 having a take-up mouth 307 likewise slightly flared at 308 leads from this recess toward the take-up mass not shown, this channel being adapted to receive the lower portion of my tubular light-trap. The rear wall of both channels is formed by a single plate 309 which forms the back wall 310 of the recess and extends upwardly and downwardly from points adjacent the forward portion of the recess. Extending upwardly from plate 309 toward the top or delivery side of the magazine is a supporting and baffling plate 311 which cooperates with the upper portion of plate 309 to furnish a part of the housing for the control mechanism for the light-trap, later described. Upon the backward side of this plate is supported a film tensioning arm 312 in the form of a flat leaf spring to furnish tension control according to the Bundick and Proctor system.

A consideration of Figures 7 to 11 inclusive upon sheet two of the drawings will make clear the construction of my tubular light-trap. A cup 313 is formed in a slide 314 working in a depression or channel 315 shaped like an inverted U formed by a small baffle plate 315' extending between the floor of the magazine and the upwardly extending portion of plate 309. A right angled off set portion 316 of the slide is attached to (or formed with) and moves a tubular member or sleeve 317 which completely surrounds the film f and furnishes a light-trap. This tubular member preferably is formed with U-shaped depressions 318 and 319 in its top and bottom portions respectively and is guided by corresponding and cooperating U-shaped depressions 320 and 320' stamped in the top and bottom surfaces respectively of the cover C and bottom wall respectively of the magazine. These depressions may be of the shape shown in Figure 9. Alternatively and preferably, such configurations may be reversed with the openings of the respective U-shaped formations being disposed toward the edges of the film slide.

From a consideration of Figures 7 to 11 inclusive the construction and method of operation of this light-trap will be clear. The narrow bounding surfaces of the tubular member 311 form guides respectively for the opposite edges of the film. As will best be seen from Figure 10, the edge guide furnished by guide 319, in the from of a single flat member 322, is extended to support a short open-ended tube 324 shaped like light-trapping tube 317. At this point this guide must be flat since the film is moved away from it at the central portion. The opposite or outer edge of the film may be left without guidance or be guided as in said Morsbach Patent 2,175,538. See Figure 3 thereof. The cover of the magazine may be formed with a depression 323 over the gate receiving recess. The inner surface of this recess bears directly upon the edge of the film f as it passes the fixed apertured section 8 (when the magazine is in a camera). This construction provides an open space or aperture over which the film passes. The film therefore passes from a delivery mass through the delivery channel then through light trapping tube 317 across the open space above edge guide 319 through short tube 324 and on through the take-up channel to a take-up mass not shown in these figures. When such a magazine is disposed within the camera with the light-trap in running position, a presser plate 86 may be moved into position thereby pressing the film freely against the fixed apertured plate 8. Tube 324 which at all times remains within the take-up channel is effective both to guide the entire light trapping structure as it is moved from one position to the other and also firmly to support it in either position. It will of course be understood that when my tubular light-trap is disposed in protective position this aperture, or, more accurately speaking the extended portion of this edge guide, is disposed within the take-up channel.

The construction shown in Figure 11 differs from that previously described in that guides for both edges of that portion of the film which is exposed are furnished by the light-trap and that the cup or motion receiving member is differently constructed.

Cup 333 is substantially as long as the width of the film in order to give a greater bearing surface for the control member which enters therein in order to operate the slide. This control member resembles pin 120 but is much longer. As before this cup is mounted upon the end of a slide 334 offset at 336 and attached to the main tubular portion 337 of the light-trap. The edges of this tube are continued in the form of flat edge guides 338 and 339 which bound the top and bottom edges of an exposure opening 341 and terminate in a short supporting tube 344. In operation, the movable gate member 86 works through this opening 341. At this time the film is moved forwardly out of contact with the central portions of these edge guides but the portions adjacent the tubes continue to guide the film. Thus, it will be seen that a somewhat more rigid structure is provided and both edge guides are furnished by the light-trap itself.

Figure 11A illustrates a simpler form of light trapping tube which is similar in many respects to the light traps previously discussed. In this instance the supporting short tube 344 or 324 and the edge guide or guides connecting it with the main tube are completely omitted. As will be clear from Figure 11A a light trapping tube 357 is provided similar to tubes 317 and 337. This tube is supported by an offset portion 356 of a slide 354 which terminates in a cup 353 corresponding to cups 333 and 313 previously described. In all respects the operation of this light-trap is the same as that previously mentioned except that edge guides and the supporting tube below the main tube are omitted. In this instance an edge guide such as shown in the said Morsbach Patent 2,175,538 as 12 disposed upon the floor of the magazine receiving compartment and an edge guide 134 formed in the cover of the magazine may well be used. This light-trap is of course guided in the manner previously described for the single bladed light-trap 111 as can best be seen in Figure 4. The light-trap with the film disposed therewithin moves from take-up channel 306 to delivery channel 303 being guided by grooves corresponding to 113 and 114 as shown in that figure. In view of its great simplicity for many purposes I prefer this form of tubular edge guide.

With such a structure, I may use edge guides and control means therefor, articulated with the control mechanism hereof, such as described and claimed in the patents to Proctor 1,944,037 and 1,944,033 both dated January 16, 1934. Alternatively, I may dispense with edge guides altogether as for a camera which is to be sold cheaply and not used for critical photography.

As previously made clear, any of the means for controlling a single bladed light-trap as previously described herein may be applied to this tubular light-trap. That is to say, cup 313 as the magazine is placed in position within the camera immediately embraces operating pin 120 mounted upon control arm 121 providing the structure of Figure 6 is utilized as is preferred for many purposes. Alternatively, however, cup 333 may be used with an elongated pin such as described in connection therewith. If, however, it is desired to control the light-trap in accordance with the mechanism previously described, I may form slide 314 and those constructed similarly thereto, namely slides 334 and 354, in accordance with the construction shown in Figures 13, 14, 20 and 21. In these cases the movement of control button 62 running position will serve to withdraw the light-trap from protective to running position by coaction between pinions and a rack formed in the slide as previously described. Contrary movement as previously described may be afforded by movement of the control button to stop the film or preferably by removal of the magazine from the apparatus in accordance with the latching mechanism of Figures 18, 19 and 20. In the former case it will be understood that I move this tubular member through the gate while it is closed between each "shot." To accommodate the light-trap under these conditions I may supply sufficient resilient movement of the movable gate or presser member 80 so that the needed separation of the plates can take place. In the construction of Figure 19, however, in order to cam the presser member away from the fixed gate member I place a camming surface 371 upon the lower edge of a tubular light trapping member 372 of the sort shown in Figure 11A. By reason of this construction the gate members will be separated sufficiently easily to permit the light-trap to move between them.

The advantages of my invention will be clear from the above portion of this specification, the drawings attached hereto and made a part hereof, and the subjoined claims. These advantages include the provision of an improved magazine wherein I supply a closed recess which conserves all of the great and proved advantages of the Ford-Morsbach type of magazine wherein the focal plane is established entirely by the apparatus yet provide a construction which protects the film from light and rough handling.

I claim:

1. A film magazine including a substantially rectangular casing with a recess formed in an edge wall thereof, a film being housed within said magazine and passing from a delivery coil within said magazine through a first opening in an edge wall bounding said recess adjacent the upper front edge of said recess and across said recess and into the interior of said casing through a second opening in said edge wall bounding said recess aligned with said first opening and adjacent the lower front edge of said recess, said edge wall of said recess being formed with such openings, a presser member supported by said magazine and loosely disposed in said recess parallel to and adjacent the side of the film relatively distant from the front opening of said recess and between it and the back of said recess, and motion-receiving means connected to said presser member and extending backwardly therefrom away from the film and toward the back of said recess for cooperation with motion-transmitting means disposed upon an apparatus with which the magazine is adapted to be employed, a side of said recess normal to the plane of said presser member being open for the reception of such motion-transmitting means.

2. A film magazine including a substantially rectangular casing with a recess formed in an edge wall thereof, a film being housed within said magazine and passing from a delivery coil within said magazine through a first opening in an edge wall bounding said recess adjacent the upper front edge of said recess and across said recess and into the interior of said casing through a second opening in said edge wall bounding said recess aligned with said first opening and adjacent the lower front edge of said recess, said edge wall of said recess being formed with such openings, and a presser member supported by said magazine and loosely disposed in said recess and having a film engaging surface parallel to and adjacent the side of the film relatively distant from the front opening of said recess and between it and the back of said recess and having a formation extending backwardly therefrom away from the film and toward the back of said recess and containing openings for the reception of motion-transmitting means disposed upon an apparatus with which the magazine is adapted to be employed, a side of said recess normal to the plane of said presser member being open for the reception of such driving means.

3. In a film magazine including a recess formed in an edge wall thereof, a film passing from the magazine at a front opening at an upper front edge of said recess and across said recess and back into the magazine through a second opening aligned with said front opening and at the lower front edge of said recess, said recess being provided with such openings, the optical axis of the magazine passing through said recess from front to back, a presser member disposed adjacent the side of the film nearer said recess and loosely supported by said magazine and being so disposed that it is normal to and intersected by said axis, a supporting member extending backwardly from said presser member and containing instrumentalities adapted to be engaged by supporting and positioning means mounted upon an apparatus with which the magazine is to be used and extending into said recess in a direction normal to said optical axis when the magazine is placed in assembled relation with the apparatus, said recess being formed with an opening for the reception of said supporting and positioning means, and means for preventing light from reaching the side of said film adjacent said recess until said magazine has been disposed in light tight relation with said apparatus.

4. In a film magazine having side walls and an edge wall at right angles thereto in which a recess is formed with aligned openings in said edge wall above and below said recess through which a film passes from said magazine across the front of said recess and again into said magazine, a presser member, means for loosely supporting said presser member adjacent the film as it passes across the front side of said recess and between the film and the back of said recess, and means mounted upon said magazine and operatively connected with said presser member and having a surface engageable with an instrumentality entering said recess in a direction normal to the side walls of said magazine for moving said presser member forwardly toward the film, said recess having an opening in a plane parallel to a side wall of the magazine for the reception of such instrumentality.

5. In a film magazine, a relatively narrow substantially rectangular casing having parallel side walls joined by edge walls at right angles thereto, one of said edge walls being formed with a recess, a delivery channel leading to one front edge of this recess, a take-up channel leading from the opposite front edge of said recess, a film passing through said channels across said recess from and to the interior of said magazine, a presser member disposed across said recess adjacent the film and between it and the back of said recess thereby joining one side of said delivery and take-up channels, said presser member being loosely mounted in said recess and one side of said recess parallel to the plane of one of said side walls of the magazine being open, and means attached to said presser member whereby said presser member is operated by a member which is introduced into said recess through said open side from an apparatus with which said magazine is to be used.

6. A film magazine comprising a substantially rectangular casing with a recess formed in an edge wall thereof and side walls extending from said edge wall at right angles thereto, said recess having two aligned openings adjacent the front opening thereof and in the top and bottom walls respectively of said recess, a film passing from a delivery coil through one of said openings and to a take-up coil, a presser member, means for loosely supporting said presser member in said recess parallel to and adjacent the side of the film relatively distant from the front opening of said recess, said presser member having a film contacting front portion and an operation portion which extends backwardly therefrom away from the film and toward the back of said recess, said portion including instrumentalities adapted to engage and be operated by motion transmitting means disposed upon an apparaus with which the magazine is adapted to be employed.

7. In a film magazine having side walls and an edge wall at right angles thereto, a light admitting aperture being formed in one of said edge walls, a closed recess within said magazine opposite said light admitting aperture, said recess having an opening through one of the side walls of said magazine, the other of said side walls extending to said edge wall with said aperture, the forward portion of said closed recess being formed by a presser member having a film contacting surface disposed parallel to said aperture and two flanges extending at right angles thereto rearwardly toward the interior of said magazine and the rearward portion of said recess being formed by a fixed bracket having a central portion opposite said presser member and forwardly extending flanges at right angles thereto and parallel to and adjacent said flanges of said presser member.

8. In a magazine adapted for use with a film handling apparatus, said magazine including a substantially rectangular casing with a recess formed in an edge wall thereof and flat side walls at right angles to said edge walls, a film being housed within said casing and passing from a delivery coil within said casing through a first opening in an edge wall adjacent the upper front edge of said recess and across said recess and to the interior of said casing through a second opening in said edge wall of said recess aligned with said first opening and adjacent the lower front edge of said recess, said edge wall of said recess being formed with such openings, a presser member having a forward plane film engaging portion and supporting means extending rearwardly therefrom, and means cooperating with said rearwardly extending supporting means for disposing said presser member across the front edge of said recess in a position wherein it closes said recess with its film engaging portion parallel to the film and normally inert and out of pressing relation thereto, one of the parallel side walls of the magazine being extended to form a closure for one side of said recess and the other side of said recess being open for the reception of an operating instrumentality carried by a film handling apparatus with which the magazine is adapted to be employed.

9. In a magazine adapted for use with a film handling apparatus, said magazine including a substantially rectangular casing with a recess formed in an edge wall thereof and flat side walls at right angles to said edge wall, a film being housed within said magazine and passing from a delivery coil within said magazine through a first opening in an edge wall adjacent the upper edge of said recess and across said recess and to the interior of said casing through a second opening in said edge wall of said recess aligned with said first opening and adjacent the lower front edge of said recess, said edge wall of said recess being formed with such openings, and means for closing said recess, said means including a U-shaped presser member, means for loosely supporting said presser member in said recess with the cross bar of said member parallel to and adjacent the side of the film relatively distant from the front opening of said recess and between it and the back of said recess and engageable with said side of the film and the legs of said U extending at right angles thereto and to said side walls toward the interior of said magazine, and a U-shaped bracket disposed toward the interior of said magazine, the cross bar of the U-shaped bracket being opposite and parallel to said presser member and the legs of said U-shaped bracket being disposed adjacent and parallel to the legs of said U-shaped presser member thereby closing the edges of said recess.

10. In a magazine adapted for use with a film handling apparatus, said magazine including a substantially rectangular casing with a recess formed in an edge wall thereof, a film being housed within said casing and passing from a delivery coil within said casing through a first opening in an edge wall adjacent the upper edge of said recess and across said recess and to the interior of said casing through a second opening in said edge wall of said recess aligned with said first opening and adjacent the lower front edge of said recess, said edge wall of said recess being formed with such openings, a presser member, means for loosely supporting said presser member in said recess parallel to and adjacent the side of the film relatively distant from the front opening of said recess and between it and the back of said recess, and a leaf spring connected to said presser member and extending backwardly therefrom away from the film and toward the back of said recess for engagement with and compression by operating means disposed upon an apparatus with which the magazine is adapted to be employed, a side of said recess normal to the plane of said presser member being open for the reception of said operating means, said presser member being disposed inert and adjacent the plane of the film prior to the reception of said operating means.

11. In a film magazine having edge walls and side walls at right angles thereto, one of said edge walls having a light admitting opening and a closed recess extending backwardly therefrom into the interior of said magazine, said closed recess comprising a first baffle plate including a first formation parallel to said edge wall and disposed toward the interior of said magazine above said opening and a second formation extending backwardly at a point adjacent the top of said opening toward the interior of the magazine at right angles to said edge wall and to said first formation, a second baffle plate upon the other or lower side of said opening and including a first formation extending along said edge wall parallel thereto and disposed toward the interior of the magazine and a second formation at right angles thereto extending away from said edge wall at a point adjacent the other or lower edge of said opening toward the interior of said magazine, the spaces between said baffle plates and said edge wall forming channels terminating respectively in an upper and a lower opening through which a film may be fed from a delivery coil across said opening and toward a take-up coil, a movable presser member for establishing the front of said closed recess, said presser member including a film contacting portion disposed in line with the first formation of said baffle plates and a flange extending from each end of said film contacting portion backwardly toward the interior of said magazine and adjacent and parallel to the relatively adjacent sides of said second formations of said first and second baffle plates respectively, and a fixed plate fastened to said magazine for completing said closed recess, said fixed plate having a major portion disposed toward the interior of said magazine and parallel to said film contacting portion of said presser member and forming the rear of said recess and two flanges extending forwardly at right angles to said major portion one disposed parallel to each of said backwardly extending flanges of said presser member and adjacent the relatively adjacent sides thereof, this construction being such that said presser member is guided between said two sets of flanges which also serve as a light baffle and form the top and bottom walls of said recess.

12. In a film magazine having a front edge wall and side walls at right angles thereto, one of said edge walls being formed with a light admitting opening and a closed recess extending backwardly into the magazine therefrom, said recess comprising two L-shaped baffle plates, one disposed above and the other below said opening with the long arm of each of said L-shaped plates parallel to said front edge wall and disposed toward the interior of the magazine therefrom and the short arms disposed at right angles thereto respectively adjacent the top and bottom of said opening, a U-shaped presser member movable in relation to the remainder of said magazine, the cross bar of said presser member having of a film contacting surface and being relatively elongated and being disposed opposite said opening and in line with the long arms of each of said L-shaped formations and extending therebetween and the upright legs of said U being at right angles to the cross bar and being disposed adjacent and parallel to the short arms of the L, and a fixed U-shaped bracket or baffle plate disposed to the rear or toward the interior of the magazine from said movable presser member, the cross bar of said fixed U-shaped plate being relatively elongated and disposed parallel to said movable presser member and the upright arms of said bracket being disposed adjacent and between said upright arms of said U-shaped movable presser member whereby said upright arms of said fixed U-shaped bracket and said cross bars of said L-shaped baffle plates furnish both guides and light breaks for said recess, a film passing along said upright arms of said L-shaped plates and along the film contacting surface of said cross bar of said U-shaped presser member.

13. In a magazine adapted for use with a film handling apparatus, said magazine including a casing for supporting a delivery coil and a take-up coil of a film, a delivery channel leading away from the delivery coil and toward the take-up coil, a presser member engaging the film at its exit from said delivery channel, a take-up channel having an entrance adjacent the end of said presser member remote from that adjacent said exit from said delivery channel and leading from said presser member toward the take-up coil, a light shielding and guiding formation extending backwardly from the inner wall of the mouth of said delivery channel in a direction normal to the path of the film, a light shielding and guiding formation extending backwardly from the mouth of the take-up channel in a direction normal to the path of the film travel, a support disposed to the rear of said presser member and having two parallel formations extending forwardly therefrom toward the presser member in a direction normal to the path of the film and parallel to but spaced from and between said guiding and light shielding formations extending backwardly from the mouths of said channels, said parallel formations being spaced from each other and said presser member having cooperating flanges extending backwardly from its film engaging surface at right angles thereto and disposed between the said adjacent sets of said formations whereby each side of each of said flanges is engaged by said formations and movement of said presser member toward and away from the film is guided by said surfaces and the admission of light to the film is prevented, and means for moving said presser member toward the film.

14. A film magazine which is substantially rectangular in shape and contains a recess formed in an edge wall thereof, said recess adjacent the upper and lower forward edges thereof having openings from and to which a film passes across the face of the recess, a gate member, means for mounting said gate member in said recess adjacent the film and between it and the back of said recess, said gate member including instrumentalities which protect the adjacent side of the film from light and thereby close the front of said recess to light entering from an open side of said recess, a side of said recess being open for the reception of instrumentalities which are disposed upon an apparatus with which the magazine is to be used and when the magazine is within said apparatus operate said gate member, and means extending within said recess for connecting said gate member and said means.

15. In a film magazine having parallel side walls and an edge wall at right angles thereto in which a recess is formed with aligned openings in said edge wall above and below said recess through which a film passes from the interior of said magazine across the front of said recess and again into said magazine, a presser member disposed across said recess adjacent the film and between it and the back of said recess, said presser member including supporting and light trapping formations which extend backwardly away from the front of said recess in a plane normal to that of said side walls into the interior of the magazine and a flange likewise extending backwardly in a plane parallel to that of said side walls, said flange including formations adapted to cooperate with positioning means carried by an apparatus with which the magazine is to be used which extend toward the magazine in a direction normal to the optical axis of the apparatus when the magazine is in assembled relation therewith, said magazine containing light trapping formations which cooperate with the light trapping formations of said presser member and said recess having an opening for the reception of said positioning means of the apparatus.

16. In a film magazine which is substantially rectangular in shape and has a recess in an edge wall across the front of which a film extends, a presser member, means for loosely disposing said presser member adjacent the film within said recess and between it and the back of said recess, said presser member including flanges which extend backwardly adjacent the top and bottom walls of said recess to support said presser member and to exclude light from the film and an operating flange which extends backwardly from said presser member in a direction parallel to and adjacent a side of said magazine and contains openings adapted for the reception of positioning pins carried by an apparatus with which the magazine is to be used.

17. A film magazine including a closed recess, a film passing from an opening at the top of said recess across said recess and back into the magazine at the bottom of said recess, a presser member disposed adjacent the side of the film nearer the back portion of said recess, a supporting member extending backwardly from the film contacting portion of said presser member and containing instrumentalities adapted to be engaged and operated by positioning means of an apparatus with which the magazine is to be used extending into said recess in a direction normal to the optical axis of the apparatus, said supporting and positioning means after having been operated being effective to hold said presser member in resilient engagement with the film, means for loosely supporting said presser member when said positioning means are not operative therefrom, and means including said presser member for preventing light from reaching the side of said film adjacent the interior of said recess.

18. In a film magazine which is substantially rectangular in shape and includes edge walls joined by side walls at right angles to said edge walls, a recess being formed in a front edge wall, a film passing across the front of said recess from one aperture at the top thereof to another aperture aligned therewith at the bottom thereof, said apertures being adjacent the front of said recess, a presser member disposed in said recess adjacent the film and between it and the back of said recess and including a film-contacting portion extending between said apertures and in line therewith, said presser member including supporting and light-trapping formations which extend backwardly away from the opening of said recess parallel to the top and bottom of said edge walls and toward the interior of the magazine and a flange likewise extending backwardly but in a plane parallel to a side wall of the magazine and adjacent thereto and including openings for the reception of positioning members carried by an apparatus with which the magazine is to be used and extending toward the magazine in a direction normal to the optical axis of the apparatus when the magazine is in assembled relation therewith.

19. In a film magazine having an edge wall in which a recess is formed and openings above and below said recess through which a film passes from said magazine across said recess and again into said magazine, means for closing said recess, said closing means including a presser member having a film-contacting surface disposed relatively adjacent but slightly back of the front opening of said recess and parallel to said edge wall and light excluding formations extending backwardly from said film-contacting surface, means for supporting said presser member adjacent the front side of said recess across which the film passes and between the film and the back of said recess, and means engageable with instrumentalities entering said recess from a direction normal to the optical axis of said magazine for moving said presser member forwardly toward the film and the front of said recess.

20. In a film magazine, a relatively narrow substantially rectangular casing having parallel side walls joined by edge walls at right angles thereto, one of said edge walls being formed with a recess, a delivery channel leading to one front edge of this recess, a take-up channel leading from the opposite front edge of said recess, a film passing through said channels across said recess, a presser member disposed across said recess adjacent the film and between it and the back of said recess, said presser member being loosely mounted in said recess and one side of said recess parallel to the plane of said side walls of the magazine being open, means associated with said presser member for excluding light from the back of the film as it extends across said recess, an operable light-trap movable between a protective position between the front side of the film opposite said presser member and a running position clear of said recess whereby said presser member may press the film forwardly, and means attached to said presser member whereby said presser member is operated by a member which is introduced into said recess through said open side from an apparatus with which said magazine is to be used.

21. A film magazine including a substantially rectangular casing with a recess formed in an edge wall thereof, a film being housed within said magazine and passing from a delivery coil within said magazine through a first opening in an edge wall bounding said recess adjacent the upper front edge of said recess and across said recess and into the interior of said casing through a second opening in said edge wall bounding said recess aligned with said first opening and adjacent the lower front edge of said recess, said edge wall of said recess being formed with such openings, a presser member supported by said magazine and loosely disposed in said recess and having a film engaging surface disposed substantially parallel to and adjacent the side of the film relatively distant from the front opening of said recess and between it and the back of said recess, motion-receiving means connected to said presser member and extending backwardly therefrom away from the film and toward the back of said recess for cooperation with motion-transmitting means disposed upon a film handling apparatus with which the magazine is to be used, means associated with said presser member for excluding light from the back of the film, said recess between said presser member and its back wall being open for the reception in a direction normal to the optical axis of the magazine of said motion-transmitting means of said apparatus, and an operable light-trap for excluding light from the front side of said film as it is disposed over said recess.

22. In a magazine for use with a film handling apparatus, a container for supporting and protecting a delivery coil and a take-up coil of a film and establishing a path through which a film is fed therein, a presser member engaging the film between said coils, a mount for said presser member which includes instrumentalities for maintaining said presser member in adjacent relation to the film in its path but loose and inert and out of pressing relation therewith, means for exposing the film to light at a point opposite said presser member, and means associated with said presser member for connecting said presser member to an operable instrumentality carried by a film handling apparatus with which the magazine is to be used, said instrumentality when operated being effective to apply resilient pressure to said presser member and to maintain it in operating and resilient relation to the film.

23. A film magazine for use with a film handling apparatus which comprises a container for supporting a delivery coil and a take-up of a film, a presser member engaging the film between said coils, a mount for said presser member which includes instrumentalities for directing said presser member in directions toward and away from the film and maintaining said preseer member in substantially parallel relation to the film and adjacent thereto and inert and free to move in both of said directions, means for exposing the film to light at a point opposite said presser member, and means associated with said presser member for connecting said presser member with an operating instrumentality carried by a film handling apparatus with which the magazine is to be used, said instrumentality including means which when the magazine and apparatus are in assembled relation with each other are effective to move said presser member against the film and maintain it in operative and resilient relation therewith.

24. In a film magazine having a light admitting opening in an edge wall, means for establishing a path through said magazine for a film, said path passing said light admitting opening, a presser member, said presser member having a film engaging surface, means for supporting said presser member within said magazine with said film engaging surface disposed adjacent said film path opposite said opening and including instrumentalities for maintaining said member loose and inert, and operable means for applying resilient pressure to said presser member.

25. In a film magazine, a presser member having a film engaging surface, a spring for resiliently pressing said surface against a film which is disposed in contact therewith, and operable means for releasing the pressure of said spring without removing said surface from such contact.

26. In a film magazine having means establishing a path through which a film is fed and an exposure aperture adjacent said path, a presser member, said presser member having a film engaging surface, means for mounting said presser member with said surface maintained loose and inert and adjacent said film path opposite said aperture, and operable means for applying resilient pressure to said pressure member and releasing it therefrom.

27. In a magazine for use with a film handling apparatus, a container for supporting and protecting a delivery and a take-up coil of a film and establishing a path for the film between said coils, means for exposing a portion of film opposite said presser member to light, and a mounting for said presser member, said mounting including means for loosely supporting said presser member in position relatively adjacent the film, resilient means disposed adjacent said presser member but normally out of effective operative contact therewith, and means for cooperating with a member carried by an apparatus with which the magazine is adapted to be used for bringing said resilient means into operative contact with said presser member and thereby subjecting said presser member to resilient pressure.

28. In a film magazine adapted for use with a film handling apparatus, a container for supporting and protecting a delivery coil and a take-up coil of a film, a presser member engageable with the film between said coils, means for exposing to light a portion of the film opposite said presser member, resilient means adapted for application to said presser member, said resilient means being so mounted that it does not subject said presser member to tension and said presser member is inert until said resilient means is placed under pressure, and means upon said magazine for the reception of an operable instrumentality carried by the apparatus with which the magazine is to be used for subjecting said resilient means to pressure whereby said resilient means is made effective upon said presser member by the operation of said instrumentality after the magazine has been placed in operative relation thereto.

29. In a film magazine adapted for use with a film handling apparatus, a container adapted to support and protect a delivery coil and a take-up coil of a film, a presser member engageable with the film between said coils, means for supporting a portion of the film opposite said presser member, a spring attached to the side of said presser member opposite that which engages the film, said spring being so mounted that it does not subject said presser member to tension, and means for the reception of an operable instrumentality carried by an apparatus with which the magazine is to be used for subjecting said spring to pressure when said magazine has been mounted in said apparatus and said instrumentality thereof operated.

30. In a film magazine, a presser member, a spring for application thereto, means for mounting said spring in engagement with said presser member but without tension, and operable means for placing said spring under tension movable between a first position wherein said spring remains without tension and a second position wherein said spring is tensioned thereby applying resilient tension to said presser member.

31. In a film magazine for use with a film handling apparatus, a presser member, a spring, a mounting for said spring by which said spring is disposed adjacent and engageable with said presser member but without tension, and means operable by an operable part of said apparatus after said magazine has been placed therein and said part operated for compressing said spring thereby placing it under tension and applying the resilience thereof to said presser member.

32. In a film magazine, a presser member, means for loosely mounting said member, a spring, a mounting within said magazine for said spring by means of which the resilience thereof may be directly applied to said presser member, a compressor member for engaging said spring and placing it under tension, and a mounting for said compressor member on which said compressor member may be moved from a position in which the resilience of said spring is not applied to said presser member to a position wherein said resilience is so applied.

33. In a film magazine, a presser member having a surface which engages a film, a pin attached to said presser member and extending away from said film engaging surface, a spring coiled upon said pin, a compressor member for engaging said spring and placing it under tension, and a mounting for said compressor member upon which said member may be moved from a position wherein said presser member does not compress said spring to one wherein it does compress said spring thereby applying resilient pressure to said presser member.

34. In a magazine adapted for use with a film handling apparatus, a container for supporting and protecting a delivery coil and a take-up coil of a film, a presser member engaging the film between said coils, means for exposing to light a portion of the film opposite said presser member, a pin attached to and extending backwardly from the side of said presser member opposite that which engaged the film, a spring coiled loosely about said pin, a plate with an opening which embraces said pin and is disposed thereabout without engagement therewith at a point relatively distant from said presser member, the spring being disposed between said presser member and said plate and normally not under tension, means for supporting said plate in such position, and means for cooperation with means carried by the apparatus with which the magazine is to be used for engaging said plate, such engagement being effective to force said plate toward said presser member thereby moving said presser member forwardly and compressing said spring and maintaining the film under resilient tension.

35. In a magazine adapted to be used with a film handling apparatus, a container for supporting and protecting a delivery coil and a take-up coil of a film, a presser member engaging the film between said coils, means for exposing to light a portion of the film opposite said presser member, a pin attached to said presser member upon the side thereof opposite that which engages the film and extending backwardly therefrom, a spring loosely coiled about said pin, a compressor element associated with said spring and normally so disposed in relation thereto that it does not subject said spring to tension and hence leaves said presser member inert, and means for the reception of an instrumentality carried by the apparatus with which the magazine is adapted to be used which engages said compressor element so that upon movement of said instrumentality it is forced against said spring and hence is effective to move said presser member against the film and to maintain it under resilient pressure.

36. In a film magazine, a presser member, said presser member having a film engaging forwardly facing surface and two flanges extending backwardly therefrom at right angles thereto, a pin disposed in the rearward portion of said presser member and extending backwardly therefrom, a compressor plate through which said pin passes, a coiled spring encircling said pin and extending between said compressor plate and the rearward portion of said presser member, a supporting bracket, said bracket having a main portion parallel to the film engaging portion of said presser member and disposed rearwardly thereof toward the interior of said magazine and two forwardly extending flanges at right angles to said portion and parallel to said rearwardly extending flanges of said presser member, said last mentioned flanges engaging said flanges of said presser members upon the relatively adjacent sides thereof, supporting structures engaging said inwardly extending flanges of said presser member upon the sides thereof relatively distant from each other and from those engaged by said flanges of said supporting bracket whereby said presser member is guided in a movement normal to the plane through which the film moves when in contact with said film engaging surface thereof, said flanged presser member and said flanged bracket forming an enclosed recess and said compressor plate being disposed therewithin, mounting means extending from said bracket forwardly within said recess for supporting said compressor plate, and an opening within said otherwise enclosed recess at one side thereof for the introduction of instrumentalities which engage said compressor plate and upon movement compress said spring thereby applying resilient pressure thereto.

37. In a magazine adapted for use with a film handling apparatus, said magazine including a casing for supporting and protecting a delivery coil and a take-up coil of a film, a delivery channel leading away from the delivery coil and toward the take-up coil, a presser member engaging the film at its exit from said delivery channel, a take-up channel having an entrance adjacent the end of said presser member remote from that adjacent said exit from said delivery channel and leading from said presser member toward the take-up coil, a light shielding and guiding formation extending backwardly from the inner portion of the mouth of said delivery channel in a direction normal to the path of the film, a light shielding and guiding formation extending backwardly from the mouth of the take-up channel in a direction normal to the path of the film, a support disposed to the rear of said presser member and parallel to the face thereof, two parallel formations extending forwardly from said support toward the presser member in a direction normal to the path of the film and parallel to but spaced from and between said guiding and light shielding formations extending backwardly from the mouths of said channels, said parallel formations being spaced from each other and said presser member having cooperating flanges extending backwardly from its film engaging surface at right angles thereto and disposed between the said adjacent sets of said formations whereby each side of each of said flanges is engaged by said formations and movement of said presser member toward and away from the film is guided by said surfaces and the admission of light to the film is prevented, a pin extending backwardly from the side of said film engaging section of said presser member toward said supporting formation of said supporting member, a spring loosely placed about said pin, a compressor plate having an opening through which said pin is freely movable and engaging the end of said spring relatively remote from said presser member for compressing said spring when said plate is moved toward the film, means for guiding said compressor plate for movement toward and away from the film, and means for the reception of an operating instrumentality carried by the apparatus with which the magazine is to be used, said receiving means being so disposed that said instrumentality engages a face of said compressor plate opposite that relatively adjacent said presser member so that upon the movement thereof said spring is compressed.

38. In a film magazine having means for supporting a delivery and take-up coil of a film and an exposing aperture therebetween past which the film is moved, a presser member disposed opposite said aperture and adjacent the film, a pin mounted upon the side of said presser member opposite that engaging the film and extending therefrom toward the interior of the magazine, a compressor plate, said pin passing through an opening in said compressor plate, said plate being provided with such an opening and being disposed parallel to said presser member and toward the interior of the magazine, a spring coiled about said pin between said plate and said presser member, a support disposed to the rear toward the interior of the magazine from said compressor plate, and two pins mounted in said support and extending forwardly therefrom through openings in said compressor plate, said plate being formed with such openings, whereby said plate is mounted for free movement and when moved toward said presser member compresses said spring and applies its resilience to said member.

39. In a film magazine having side walls and edge walls at right angles thereto, an exposure aperture formed in one of said edge walls, a film being housed within said magazine and passing said aperture as it is moved from a delivery coil to a take-up coil, said magazine being adapted for use with a film handling apparatus, a presser member disposed opposite said aperture and adjacent the film, a pin mounted upon the side of said presser member opposite that engaging the film and extending therefrom toward the interior of the magazine, a compressor plate, said pin passing through an opening in said compressor plate, said plate being provided with such an opening and being disposed parallel to said presser member and toward the interior of the magazine, a spring coiled about said pin in between said plate and said presser member, a support disposed to the rear toward the interior of the magazine from said compressor plate, two pins mounted in said support and extending forwardly therefrom through openings in said compressor plate, said plate being formed with such openings, a side wall of said magazine adjacent said compressor plate being formed with an opening for the reception of a member of the film handling apparatus with which the magazine is adapted for use which is effective for moving said compressor plate toward said spring thereby compressing it, whereby said plate is mounted for free movement and when moved toward said presser member will compress said spring and apply its resilience to said member, and means for preventing light which enters through said side opening from reaching the film.

40. In a film magazine adapted for use with a film handling apparatus, said magazine having side walls and edge walls at right angles thereto, one of said edge walls having a light admitting opening, a presser member, a spring mounted upon said presser member upon the side thereof opposite that which engages a film, means for mounting said presser member opposite said opening, said spring while said presser member is supported by said mounting means being without tension and said presser member thereby being inert, a broad side wall of said magazine adjacent said spring having an opening for the reception of an operable instrumentality of said apparatus which upon movement thereof engages and tensions said spring and said presser member, and means associated with said presser member for light trapping said opening.

41. A film magazine for use in a film handling apparatus having a magazine receiving compartment and means for imparting resilience to a presser member of a magazine; said magazine having an edge wall with a light admitting opening, a presser member with a film engaging surface, means for loosely supporting said presser member with said film engaging surface inert and opposite said opening, and means operatively attached to said presser member and so formed and disposed as to be engaged and operated by said resilient means of said apparatus for imparting the resilience of said means to said presser member after said magazine has been placed in said compartment.

42. A magazine for use in a film handling apparatus having a magazine receiving compartment and means for imparting resilience to a presser member of a magazine; said magazine including a front edge wall having a light admitting opening, a presser member for engaging a film fed through said magazine past said opening, means for loosely mounting said presser member in said apparatus opposite said opening, and a connection engageable with said means of said apparatus when said magazine is placed in said compartment whereby said means of said apparatus renders said presser member resilient.

43. A magazine for use in a film handling apparatus having a magazine receiving compartment and a resiliently movable member associated therewith; said magazine having a front edge wall with a light admitting opening, a presser member, and means for loosely mounting said presser member opposite said opening for engaging a film as it is fed in said magazine past said opening; and means for connecting said presser member and said resilient member of said apparatus when said magazine is placed in said compartment whereby the resilience of said means of said apparatus is imparted to said presser member.

44. In a film magazine having a front edge wall with a light admitting opening, a presser member with a film engaging surface, means for loosely supporting said presser member with said film engaging surface opposite and adjacent said opening, said presser member when so supported being inert, and an operating extension of said presser member adapted to cooperate with a resilient and movable member of a film handling apparatus with which said magazine is to be used through which resilient pressure can be applied to said presser member.

45. In a film magazine having a front edge wall with a light admitting opening, a presser member, said presser member having a film engaging surface, a supporting structure rigidly attached to said presser member at a point other than its film engaging surface and extending therefrom toward the interior of said magazine for mounting said presser member for movement toward or away from a film which passes along said film engaging surface, and an operating extension from said presser member through which resilient pressure independent of said supporting means may be applied to said presser member.

46. In a film magazine having a front edge wall with a light admitting opening, a presser member disposed opposite said opening, said presser member having a film engaging surface, a supporting plate mounted parallel to said presser member toward the interior of said magazine, two pins rigidly attached to the side of said presser member opposite said film engaging surfaces and extending backwardly through openings in said plate, said plate being formed with such openings, and said pins having heads upon the side of said plate relatively distant from said presser member whereby said presser member is loosely mounted for movement toward and away from said opening, and means attached to said presser member and adapted to cooperate with resilient means carried and operated by an apparatus with which said magazine is to be used whereby resilience is imparted to said presser member by said apparatus.

47. In a film magazine having a front edge wall with a light admitting opening, a presser member disposed opposite said opening, said presser member having a film engaging surface, a supporting plate mounted parallel to said presser member toward the interior of said magazine, two pins rigidly attached to the side of said presser member opposite said film engaging surface and extending backwardly through openings in said presser plate, said plate being formed with such openings, and said pins having heads upon the side of said plate relatively distant from said presser member whereby said presser member is loosely mounted for movement toward and away from said opening, and a flange attached to said presser member and extending backwardly therefrom and including formations adapted to cooperate with resilient means caused and operated by an apparatus with which said magazine is to be used whereby resilience is imparted to said presser member by said apparatus.

48. In a film magazine adapted for use with a film handling apparatus having a member for furnishing resilience to the presser plate of a magazine; said magazine having side walls and edge walls at right angles thereto, one of said front edge walls having a light admitting opening, a presser member, said presser member having a film engaging surface parallel to said front edge wall and two flanges extending rearwardly therefrom at right angles thereto and to said side walls and toward the interior of said magazine, a fixed baffle and guiding plate substantially parallel to said front edge wall and disposed rearwardly thereof toward the interior of said magazine, said baffle plate having a rearwardly extending right angled extension, said extension being disposed adjacent and parallel to one of said right angled rearwardly projecting flanges of said presser plate, a fixed baffle and guiding plate disposed upon the other side of said opening and parallel to said front edge wall and having a rearwardly extending right angled extension toward the interior of said magazine, said extension being disposed adjacent said other flange of said presser plate, said flanges of said baffle plates furnished a top and bottom guide respectively for the exterior surfaces of said flanges, a fixed supporting and baffle plate disposed within said magazine toward the interior thereof and having a main portion parallel to said presser member and two forwardly extending projections at right angles thereto, each of said projections being disposed relatively adjacent each of said flanges of said presser member and upon the sides of each thereof other than those adjacent which said extensions of said first mentioned baffle plates are disposed, said projections thereby furnishing a light blocking guide way in which said presser member is freely movable toward and away from said opening, and an opening in said magazine within the cross-sectional area of said above recited structure for the reception of a resilient member carried by said apparatus which when said magazine is in use with said apparatus furnishes resilience thereto.

49. In a film magazine having side walls and edge walls at right angles thereto, one of said front edge walls having a light admitting opening, a presser member, said presser member having a film engaging surface parallel to said first edge wall and two flanges extending rearwardly therefrom at right angles thereto and to said side walls and toward the interior of said magazine, a fixed baffle and guiding plate substantially parallel to said front edge wall and disposed rearwardly thereof toward the interior of said magazine, said baffle plate having a rearwardly extending angled extension, said extension being disposed adjacent and parallel to one of said right angled rearwardly projecting flanges of said presser plate, a fixed baffle and guiding plate disposed upon the other side of said opening and parallel to said front edge wall and having a rearwardly extending right angled extension toward the interior of said magazine, said extension being disposed adjacent said other flange of said presser plate, said right angled extensions of said baffle plates furnishing a top and bottom guide respectively for the exterior surfaces of said flanges, a fixed supporting and baffle plate disposed within said magazine toward the interior thereof and having a main portion parallel to said presser member and two forwardly extending projections at right angles thereto, each of said projections being disposed relatively adjacent each of said flanges of said presser member and upon the sides of each thereof other than those adjacent which said extensions of said first mentioned baffle plates are disposed, said projections thereby furnishing a light blocking guide way in which said presser member is freely movable toward and away from said opening, and pins extending backwardly toward the interior of said magazine from said presser member and passing through openings in said supporting plate, said plate being furnished with such openings.

50. In a film magazine having side walls and edge walls at right angles thereto, one of said front edge walls having a light admitting opening, a presser member, said presser member having a film engaging surface parallel to said first edge wall and two flanges extending rearwardly therefrom at right angles thereto and to said side walls and toward the interior of said magazine, a fixed baffle and guiding plate substantially parallel to said front edge wall and disposed rearwardly thereof toward the interior of said magazine, said baffle plate having a rearwardly extending right angled extension, said extension being disposed adjacent and parallel to one of said right angled rearwardly projecting flanges of said presser plate, a fixed baffle and guiding plate disposed upon the other side of said opening and parallel to said front edge wall and having a rearwardly extending right angled extension toward the interior of said magazine, said extension being disposed adjacent said above mentioned extension of said presser plate, said right angled extensions of said baffle plates furnishing a top and bottom guide respectively for the exterior surfaces of said flanges, a fixed supporting and baffle plate disposed within said magazine toward the interior thereof and having a main portion parallel to said presser member and two forwardly extending projections at right angles thereto, each of said projections being disposed relatively adjacent each of said flanges of said presser member and upon the sides of each thereof other than those adjacent which said extensions of said first mentioned baffle plates are disposed, said projections thereby furnishing a light blocking guide way in which said presser member is freely movable toward and away from said opening, pins extending backwardly toward the interior of said magazine from said presser member and passing through openings in said supporting plate, said plate being furnished with such openings, said presser plate also having a flange extending backwardly therefrom toward the interior of said magazine and parallel to a side wall of said magazine and disposed closely adjacent thereto, said backwardly extending positioning flange including a formation adapted to coact with a positioning member of a film handling apparatus with which said magazine is to be used.

51. In a film magazine having an edge wall with a light admitting opening, a presser member with a film engaging surface, means for loosely mounting said presser member opposite said opening with said surface adjacent thereto, and a spring mounted upon the side of said presser member opposite said surface, said spring being free of operative contact with any part of said magazine other than said presser member.

52. In a film magazine having an edge wall formed with a light admitting opening, a presser member with a film engaging surface, means for loosely mounting said presser member opposite and relatively adjacent said opening with said surface adjacent thereto, and a leaf spring attached to the rear side of said presser member opposite said surface, said leaf spring being entirely free of contact with any part of said magazine other than said rear side of said presser member upon which it is so mounted.

53. In a film magazine adapted for use with a film handling apparatus and having an edge wall formed with a light admitting opening, a presser member disposed opposite said opening, said presser member having a film engaging surface relatively adjacent said opening and flanges extending backwardly from each end thereof toward the interior of said magazine, a bracket opposite said presser member and disposed toward the interior of said magazine, said bracket having a principal portion parallel to said film engaging portion of said presser member and two forwardly facing flanges at right angles thereto and so disposed as to be positioned relatively adjacent said backwardly facing flanges of said presser member, said flanges cooperating with said flanges of said presser member for forming the light tight sides of a closed recess, and a spring attached to the rear of said presser member opposite said film engaging surface and extending backwardly into said recess toward said bracket, said spring being free of contact with any part of said magazine other than said presser member and being inert, an opening being formed in said recess for the reception of a member of said apparatus which engages said spring and places it and said presser member under tension.

54. In a film magazine adapted for use with a film handling apparatus and having an edge wall formed with a light admitting opening, a presser member disposed opposite said opening, said presser member having a film engaging surface relatively adjacent said opening and flanges extending backwardly from each end thereof toward the interior of said magazine, a bracket opposite said presser member and disposed toward the interior of said magazine, said bracket having a principal portion parallel to said film engaging portion of said presser member and two forwardly facing flanges at right angles thereto and so disposed as to be positioned relatively adjacent said backwardly facing flanges of said presser member, said flanges cooperating with said flanges of said presser member for forming the light tight sides of a closed recess, and a leaf spring attached by each of its ends to the rear of said presser member to form a rearwardly extending arc opposite said film engaging surface of which said member is the chord and extending backwardly into said recess toward said bracket and free of contact with any part of said magazine except said presser member, an opening being formed in said recess for the reception of a member of said apparatus which engages said arc of said leaf spring and places it and said presser member under tension.

55. In a film magazine having a front edge wall with an opening for admitting light and side walls at right angles thereto, a presser element, means for supporting said presser element inertly opposite said opening, a lip or flange extending backwardly from said presser element adjacent and parallel to a side wall of said magazine, said lip including formations for engagement by movable control means of a film handling apparatus with which said magazine is to be used, the movement of said control members when applied to said lip rendering said presser element operable upon a film.

56. In a film magazine having a front edge wall with an opening for admitting light and side walls at right angles thereto, a presser element, means for loosely supporting said presser element opposite said opening, a lip extending backwardly from said presser element adjacent and parallel to a side wall of said magazine, said lip including openings for the reception of pins carried by a movable part of a film handling apparatus with which said magazine is to be used, the movement of said pins within said opening rendering said presser element operable upon the film.

57. In combination, a film handling apparatus and a magazine for use therewith; said magazine including a substantially rectangular casing with a recess formed in an edge wall thereof, a film being housed within said magazine and passing from a delivery coil within said magazine through a first opening in an edge wall bounding said recess adjacent the upper front edge of said recess and across said recess and into the interior of said casing through a second opening in said edge wall bounding said recess and aligned with said first opening and adjacent the lower front edge of said recess, said edge wall of said recess being formed with such openings, a presser member supported by said magazine and loosely disposed in said recess parallel to and adjacent the side of the film relatively distant from the front opening of said recess and between it and the back of said recess, and motion-receiving means connected to said presser member and extending backwardly therefrom away from the film and toward the back of said recess for cooperation with motion-transmitting means disposed upon said film handling apparatus; said film handling apparatus having a lens, a film receiving compartment, said compartment having an opening in a plane parallel to the optical axis of the apparatus, a cover for closing said opening, a fixed apertured gate member disposed upon an edge of said compartment relatively adjacent said lens and having a film contacting surface disposed in the focal plane of the apparatus, motion transmitting means disposed within said compartment and having an operating instrumentality extending therefrom in a direction normal to the optical axis and toward said opening, said instrumentality and said fixed apertured gate section being so dimensioned and so positioned within said compartment that when said magazine is placed within said compartment said instrumentality engages said motion receiving means connected to said presser member, and means for operating said motion transmitting means.

58. In combination, a film handling apparatus and a magazine for use therewith; said magazine including a substantially rectangular casing with a recess formed in an edge wall thereof, a film being housed within said magazine and passing from a delivery coil within said magazine through a first opening in an edge wall bounding said recess adjacent the upper front edge of said recess and across said recess and into the interior of said casing through a second opening in said edge wall bounding said recess and aligned with said first opening and adjacent the lower front edge of said recess, said edge wall of said recess being formed with such openings, a delivery channel leading from said delivery coil to said first opening, a take-up channel leading from said second opening toward said take-up coil, a presser member supported by said magazine and loosely disposed in said recess parallel to and adjacent the side of the film relatively distant from the front opening of said recess and between it and the back of said recess, and forming a continuation of one or a back wall of said delivery and take-up channels, and motion-receiving means connected to said presser member and extending backwardly therefrom away from the film and toward the back of said recess for cooperation with motion-transmitting means disposed upon said film handling apparatus, said motion-transmitting means when operated being effective to render said presser member operable upon a film passing across said recess; said film handling apparatus having a lens, a film receiving compartment, said compartment having an opening in a plane parallel to the optical axis of the apparatus, a cover for closing said opening, a latch for said cover, a fixed apertured gate member disposed upon an edge of said compartment relatively adjacent said lens and having a film contacting surface disposed in the focal plane of the apparatus and opposite said presser member and when said magazine is disposed within said compartment completing the other or forward wall of said channels, operable motion transmitting means disposed within said compartment and having an operating instrumentality extending therefrom in a direction normal to the optical axis and toward said opening of said compartment, said instrumentality and said fixed apertured gate section being so dimensioned and so positioned within said compartment that when said magazine is placed within said compartment said instrumentality engages said motion receiving means connected to said presser member, and means connecting said latch and said motion transmitting means for operating said motion transmitting means for rendering said presser member operable upon a film when said cover is latched.

59. In combination, a film handling apparatus and film magazine for use therewith; said magazine having side walls and an edge wall at right angles thereto in which a recess is formed with aligned openings in the front of said edge wall above and below said recess through which a film passes from said magazine across the front of said recess and again into said magazine, a presser member, means for loosely supporting said presser member adjacent the film as it passes across the front side of said recess and between the film and back of said recess; and said apparatus including means for positioning said magazine thereupon, a lens, a relatively fixed apertured gate member intersecting the optical axis of said apparatus and having a surface which defines the focal plane of the instrument, an instrumentality so disposed in relation to said positioning means and said fixed gate member that when said magazine is placed upon said positioning means it enters said recess in a direction normal to said optical axis and between the back of said recess and said presser member and engages said presser member, and means for moving said instrumentality toward and away from said apertured member after it has engaged said presser member whereby the film is brought into contact with said surface which defines said focal plane and released from engagement therewith.

60. In combination, a film handling apparatus and a magazine for use therewith; said magazine including an edge wall having a light admitting opening, a presser member, means for loosely supporting said presser member opposite said light admitting opening, means associated with said presser member and adapted for engagement by operating means of said apparatus, the film passing from a delivery coil past said opening and said presser member to a take-up coil; said apparatus including a magazine receiving compartment, means for engaging the side of the film opposite said presser member when the magazine is disposed within said compartment, and movable means for engaging said means associated with said presser member and moving said presser member toward the film and rendering it operative thereupon.

61. In combination, a film handling apparatus and a magazine for use therewith; said magazine having a light admitting opening in an edge wall thereof, a presser member, means for loosely disposing said presser member opposite said light admitting opening without operative engagement with a film, the film traveling from a delivery coil within said magazine past said opening and said presser member and to a take-up coil; said apparatus including a magazine receiving compartment, operating means within said compartment engaging said presser member of said magazine when said magazine is disposed within said compartment, and means for moving said operating means between a first position wherein said presser member remains without operative engagement with a film and a second position wherein said presser member is brought into such engagement.

62. In combination, a film handling apparatus and a magazine for use therewith; said film handling apparatus including a light admitting opening in an edge wall thereof, a presser member, means for mounting said presser member opposite said opening, a film passing from a delivery coil past said opening and said presser member to a take-up coil, and a formation extending from said presser member for engagement with and operation by an instrumentality carried by said apparatus; said apparatus including a magazine receiving compartment, a formation within said compartment adapted to engage said formation of said presser member when said magazine is disposed within said compartment, a mounting for said formation of said apparatus, and means operable from the exterior of said compartment for moving said mounting between a first position wherein said presser member is maintained without operative relation to the film and a second position wherein it is placed in such relation.

63. In combination, a film handling apparatus and a magazine for use therewith; said magazine including a light admitting opening formed in one edge wall thereof, a presser member, means for loosely supporting said presser member opposite said opening, said presser member including a formation adapted to receive an operating instrumentality of said apparatus, said presser member being inert and without operative relation with the film prior to the reception and operation of said instrumentality, the film passing from a delivery coil past said opening and presser member to a take-up coil; said apparatus including a magazine receiving compartment, a cover for closing said compartment, a latch for said cover, an instrumentality for engaging said formation of said presser member when said magazine is disposed within said compartment and for operating it for making said presser member operative upon the film, a mounting for said instrumentality, and a connection between said mounting and said latch for operating said mounting and hence said instrumentality and said formation of said presser member by the movement of said latch.

64. In combination, a film handling apparatus and a magazine for use therewith; said magazine including side walls and edge walls joining said side walls at right angles thereto, a recess being formed in one of said edge walls, a film passing from a delivery coil through an opening in a wall bounding the top of said recess across said recess to an opening in a wall bounding the bottom of said recess, said recess being formed with such openings, and passing to a take-up coil, a presser member, said presser member having a film engaging surface adjacent the side of said film nearer to the back of said recess and including a formation extending backwardly therefrom in a direction parallel to one of said side walls, means for loosely mounting said presser member in said recess adjacent the front of said opening with said film engaging surface out of operative and pressing relation to the film, said apparatus including a magazine receiving compartment, an instrumentality disposed within said compartment and adapted to engage said formation of said presser member, and a movable mounting for said instrumentality whereby said instrumentality and hence said presser member may be moved into operative relation with a film and therefrom.

65. In combination, a film handling apparatus and a film magazine for use therewith; said magazine having a light admitting opening in one edge wall thereof, a presser member, means for loosely mounting said presser member opposite said opening without operative relation to a film passing thereby, an operating member connected to said presser member, a film passing from a delivery coil between said opening and said presser member and to a take-up coil; said apparatus including a magazine receiving compartment, a slide disposed adjacent one wall of said compartment, a formation extending from said slide away from said wall of said compartment and when said magazine is disposed within said compartment toward and within said magazine and into engagement with said operating member of said presser member, said magazine being formed with an appropriate opening for the reception of said formation, and means for moving said slide from a first position wherein said presser member is maintained without operative relation to a film and a second position wherein said slide through said formation and said instrumentality attached to said presser member moves said presser member into operative relation with the film.

66. In combination, a film handling apparatus and a film magazine for use therewith; said magazine having a light admitting opening in one edge wall thereof, a presser member, means for loosely mounting said presser member opposite said opening without operative relation to a film passing thereby, an operating member connected to said presser member, a film passing from a delivery coil between said opening and said presser member and to a take-up coil; said apparatus including a magazine receiving compartment, a slide disposed upon the floor of said compartment, at least one spring extending from said slide away from the floor of said compartment toward and within said magazine and into engagement with said operating member of said presser member when said magazine is disposed in said compartment, said magazine being formed with an opening for the reception of said spring, and means for moving said slide from a first position wherein said presser member is maintained without operative relation to the film and a second position wherein said slide through said spring and said operating member connected to said presser member applies resilience to said presser member and hence to the film.

67. In combination, a film handling apparatus and a film magazine for use therewith; said magazine having a light admitting opening in one edge wall thereof, a presser member, means for loosely mounting said presser member opposite said opening without operative relation to a film passing thereby, a bracket extending backwardly from said presser member away from the film and containing at least one opening, a film passing from a delivery coil between said opening and said presser member and to a take-up coil; said apparatus including a magazine receiving compartment, a slide disposed adjacent one wall of said compartment, at least one spring extending away from said slide toward the interior of said compartment and when said magazine is disposed within said compartment passing within said magazine and within said opening or openings within said bracket, said magazine being provided with an opening for the reception of said spring or springs, and means for moving said slide from a first position wherein said presser member is maintained without resilience furnished by said spring or springs and a second position wherein said spring or springs through said opening and said bracket apply their resilience to said presser member and to the film.

68. In combination, a film handling apparatus and a film magazine for use therewith; said magazine having a light admitting opening in one edge wall thereof; a presser member, means for loosely mounting said presser member opposite said opening without operative relation to a film passing thereby, a film passing from a delivery coil between said opening and said presser member and to a take-up coil; said apparatus including a magazine receiving compartment, a slide disposed upon one wall of said compartment, a leaf spring extending from said slide away from said wall and when said magazine is disposed within said compartment through an opening therein and into engagement with the side of said presser member opposite that which engages the film, said magazine being supplied with such an opening, and means for moving said slide from a first position wherein said leaf spring is maintained without pressing relation to said presser member and a second position wherein said spring applies its resilience to said presser member.

69. In combination, a film handling apparatus and a film magazine for use therewith; said magazine having a light admitting opening in one edge wall thereof, a presser member, means for loosely mounting said presser member opposite said opening without operative relation to a film passing thereby, a leaf spring attached to the side of said presser member relatively distant from the film and bowed backwardly therefrom, a film passing from a delivery coil between said opening and said presser member and to a take-up coil; said apparatus including a magazine receiving compartment, a slide disposed adjacent one wall of said compartment, a rigid formation mounted upon said slide and extending therefrom away from said wall of said compartment and when said magazine is disposed within said compartment within said magazine and into engagement with the side of said leaf spring opposite that which is nearer said presser member, said magazine being supplied with such an opening, and means for moving said slide from a first position wherein said leaf spring is maintained without operative relation to said presser member and a second position wherein said leaf spring applies its resilience to said presser member and through it to the film.

70. In combination, a film handling apparatus and a film magazine for use therewith; said magazine having a light admitting opening in one edge wall thereof, a presser member, means for loosely mounting said presser member opposite said opening without operative relation to a film passing thereby, a motion receiving formation attached to said presser member, a film passing from a delivery coil between said opening and said presser member and to a take-up coil; said apparatus including a magazine receiving compartment, a first slide disposed upon one wall of said compartment, and a second slide disposed upon said first slide and bodily movable therewith and in relation thereto, a motion transmitting formation extending from said second slide and when said magazine is within said compartment through an opening therein and into engagement with said motion receiving formation thereof, a spring connecting said slides, and means for moving said first slide from a first position wherein the resilience of said spring is not imparted to said second slide and to said formations and a second position wherein said resilience is so supplied through said formations to said presser member and hence to the film.

71. In a film handling apparatus for use with a magazine having a presser member disposed loosely adjacent a film and adapted to be brought into operative relation therewith, a magazine receiving compartment, an operating formation extending within said compartment and adapted operatively to engage said presser member when said magazine is disposed within said compartment, and means for moving said operating formation for bringing said presser member to and from operative relation with the film.

72. In a film handling apparatus, a film receiving compartment, a fixed apertured gate member disposed upon an edge of said compartment relatively adjacent said lens and having a film contacting surface disposed in the focal plane of the apparatus, operable motion transmitting means disposed within said compartment, said means being adapted to engage a formation disposed upon a presser member carried by a magazine adapted for use with the apparatus in said compartment, and an instrumentality for moving said means from a first or threading position relatively remote from said fixed gate section to one relatively adjacent thereto but spaced a material distance from said fixed gate section, such movement when said magazine is disposed within said compartment being effective to move the presser member of said magazine from a threading to a running position.

73. In a film handling apparatus, a magazine receiving compartment, a control plate movable along a wall of said compartment, a formation extending from said plate toward the interior of said compartment and adapted to engage an operable element of a film magazine adapted for use with said apparatus after said magazine has been placed within said compartment, an operating member disposed without said compartment, and a connection between said operating member and said plate for operating said plate upon the movement of said operating member.

74. In a film handling apparatus, a magazine receiving compartment, a cover therefor, a control plate movable along a wall of said compartment, a formation extending from said plate toward the interior of said compartment and adapted to engage an operable element of a film magazine adapted for use with said apparatus after said magazine has been placed within said compartment, a latch for said cover, an operating member for said latch, and a connection between said operating member and said plate for jointly operating both thereof.

75. In a film handling apparatus, a magazine receiving compartment, a movable control plate, means for moving said member, and resilient means extending away from said plate and adapted to engage and upon movement of said plate impart resilience to an operable element of a magazine after it has been disposed within said compartment.

76. In a film handling apparatus, a magazine receiving compartment, a movable control member, means for moving said member, and at least one spring extending away from said member and toward the interior of said compartment and adapted to engage and upon movement of said member to impart its resilience to an operable element of a magazine after it has been disposed within said compartment.

77. In a film handling apparatus, a magazine receiving compartment, a movable control plate disposed along a wall of said compartment, means including a member disposed without said compartment for moving said plate, and at least one spring mounted upon and extending away from said plate toward the interior of said magazine and adapted to engage and upon movement of said plate to impart its resilience to an operable element of a magazine after it has been disposed within said compartment.

78. In a film handling apparatus, a magazine receiving compartment, a slide movable within said compartment adjacent a wall thereof, an operating member resiliently mounted upon said slide for bodily movement therewith and resilient movement relatively thereto, an operating formation extending away from said member toward the interior of said compartment and adapted to interfit with an operable element of a film magazine for use therewith, and means for operating said slide, whereby after said magazine has been placed within said compartment and said slide has been operated the resilience of said member is imparted to said operable element of said magazine.

79. In a film handling apparatus, a magazine receiving compartment, a first slide movable within said compartment adjacent a wall thereof, a second slide mounted upon said first slide for bodily movement therewith, and sliding movement relatively thereto, a spring connecting said slides, an operating formation extending away from said second slide toward the interior of said compartment and adapted to interfit with an operable element of a film magazine for use therewith, and means for moving said first slide, whereby after said magazine has been placed within said compartment and said first slide has been operated the resilience of said second slide is imparted to said operable element of said magazine.

80. In a film handling apparatus, a magazine receiving compartment, a cover for said compartment, a latch for said cover, a control plate movable within said compartment adjacent a wall thereof, an operating member resiliently mounted upon said plate for bodily movement therewith and resilient movement relatively thereto, and an operating formation extending away from said member toward the interior of said magazine and adapted to interfit with an operable element of a film magazine for use therewith, and an operating connection between said latch and said plate whereby after said magazine has been placed within said compartment and said cover closed the latching of said cover applies the resilience of said operating member to said operable member of said magazine.

81. In a film handling apparatus, a magazine receiving compartment, an operating member movable adjacent and parallel to a wall of said compartment and having an extension therefrom reaching within said compartment for engagement with an operable part of said magazine, and means operable from without said compartment for moving said operating member.

82. In a film handling apparatus, a compartment adapted to receive a magazine, a lens disposed adjacent one edge wall of said compartment, said compartment having an opening in a plane parallel to the axis of said lens for the reception of the magazine, a relatively fixed apertured gate member disposed upon and intersecting said optical axis and having a film contacting surface defining the focal plane of said apparatus, a gate operating slide disposed adjacent one side of said compartment opposite said opening and movable in a plane parallel to that of said opening, spaced motion transmitting pins extending from said slide in a direction normal to the plane thereof and toward said opening, said pins having relatively narrow surfaces and being adapted to engage a presser member disposed in the magazine and having a forwardly facing recess over the front side of which a presser member extends, said recess and said presser member being so formed and positioned that when the magazine is disposed within the apparatus said pins engage said presser member, and means for moving said slide.

83. In combination, a film handling apparatus and a magazine for use therewith, said magazine including a recess formed in an edge wall thereof, a film passing from the magazine through an opening at an upper front edge of said recess and across said recess and back into the magazine through a second opening aligned with said first opening and at the lower edge of said recess, said edge wall being formed with such openings, an operable light trapping tube extending across said recess and enclosing the length of film which passes thereover, operating means for moving said tube from a first or protective position wherein it encloses the film across said recess to a second or running position within the body of the magazine wherein it frees the film for engagement by an apertured fixed gate member disposed upon an apparatus, said operating means including a motion transmitting instrumentality engageable with a motion transmitting instrumentality carried by the apparatus; said apparatus including a compartment for the reception of said magazine, a fixed apertured gate member extending within said compartment to engage a film in said magazine as it passes over the front of said recess, means engaging the film for feeding it across said recess when the magazine is disposed within its compartment, a presser member disposed therein and so positioned that when the magazine is placed in said compartment it lies between said light trapping tube and the back wall of said recess, and sequential control means including mechanism connected to said presser member for moving said presser member toward the film after said light trapping means has been moved from said first to said second position, said moving means including an instrumentality effective when the magazine is positioned within said compartment for engaging said instrumentality of said means upon said magazine for operating said tube.

84. In combination, a film handling apparatus and a magazine for use therewith, said magazine including a recess in an edge wall thereof, a delivery channel leading between a delivery mass within the magazine and a first opening at an upper front edge of said recess, a second opening aligned with said first opening at the lower edge of said recess, said edge wall being formed with such openings, a take-up channel leading from said second opening to a take-up mass of film within said magazine, operable means for providing and destroying a completely enclosed channel across said recess when said magazine is disposed outside of the apparatus for use with which it is adapted, said channel so provided leading from said delivery to said take-up channel; said apparatus including a compartment for the reception of said magazine, means engaging the film for feeding it across said recess when the magazine is disposed within its compartment, operable means disposed within said compartment for providing and destroying a channel that when said magazine is disposed in said compartment forms an extension of said delivery and take-up channels formed in said magazine and extends from said first to said second opening, and means necessarily effective and engaging both of said operable means when said magazine is disposed within its compartment for destroying said channel upon said magazine before providing said channel within said apparatus.

85. A film magazine comprising a front wall provided with two apertures for the film moving between said apertures outside of said magazine along a straight film path, a wall portion between said apertures being at a certain distance from the straight path of the film between said apertures, and movable sleeve-shaped film guiding means adapted to slide in the longitudinal direction of the film moving between said apertures and to form a light-tight enclosing tube between said apertures for the free film portion between said apertures, leaving a free space between said sleeve-shaped film guiding means and said wall portion between said apertures which is at a certain distance from the straight path of the film between said apertures.

86. A film magazine comprising a front wall provided with two parallel slits normal to the side walls of said magazine enabling exit and entry of a film moving between said slits, a receding wall portion between said slits, and a sleeve-shaped film guiding means adapted to slide in the longitudinal direction of the film moving between said slits and to form a light-tight enclosing tube for the free film portion between said slits, leaving a free space between said sleeve-shaped film guiding means and said receding wall portion.

87. A film magazine comprising a front wall provided with two parallel slits normal to the side walls of said magazine enabling exit and entry of a film moving between said slits, a receding wall portion between said slits, and at least one sleeve-shaped tubular film guiding member adapted to slide in the longitudinal direction of the film moving between said slits and to form a light-tight enclosing tube for the free film portion between said slits, leaving a free space between said sleeve-shaped tubular film guiding member and said receding wall portion.

88. A film magazine comprising a front wall provided with two parallel slits normal to the side walls of said magazine enabling exit and entry of a film moving between said slits, a receding wall portion between said slits, and at least one sleeve-shaped tubular film guiding member adapted to slide through said slits into and out of said magazine in the longitudinal direction of the film moving between said slits and to form thereby a light-tight enclosing tube for the free film portion between said slits.

89. A film magazine comprising a front wall provided with two parallel slits normal to the side walls of said magazine enabling exit and entry of a film moving between said slits, a receding wall portion between said slits, and at least one sleeve-shaped film guiding member adapted to slide through said slits into and out of said magazine in the direction of a film moving between said slits and to form thereby a light-tight enclosing tube between said slits, said sleeve shaped film guiding member being provided with at least one formation adapted to receive an operating member of a film handling apparatus with which said magazine is to be used for moving said member.

90. A film magazine comprising a front wall provided with two parallel slits normal to the side walls of said magazine enabling exit and entry of a film moving between said slits, a receding wall portion between said slits, at least one sleeve-shaped film guiding member adapted to slide through said slits into and out of said magazine in the direction of the film moving between said slits and to form thereby a light-tight enclosing tube between said slits, said sleeve-shaped film guiding member adapted to be moved from inoperative position inside of said magazine into operative position outside of it, and spring-like means cooperating with said member and constantly tending to move the same from said inoperative into said operative position.

91. In a film camera in combination a camera casing, a removable film magazine comprising a front wall provided with two parallel slits normal to the side walls of said magazine enabling exit and entry of a film moving between said slits, a receding wall portion between said slits, a sleeve-shaped film guiding means adapted to slide in longitudinal direction of the film moving between said slits and to form a light-tight enclosing tube for the free film portion between said slits leaving a free space between said sleeve-shaped film guiding means and said receding wall portion, a pressure plate secured to said camera casing arranged behind the film within said free space between said receding wall portion and said sleeve-shaped film guiding means, an aperture plate arranged in front of said film cooperating with said pressure plate, and an intermittently moving film claw engaging said film when it is not enclosed by said tubular enclosing means.

92. In a film camera in combination a removable film magazine comprising a front wall provided with two parallel slits normal to the side walls of said magazine enabling exit and entry of a film moving between said slits, a receding wall portion between said slits, and at least one sleeve-shaped film guiding member adapted to slide through said slits into and out of said magazine in the longitudinal direction of the film moving between said slits and to form a light-tight enclosing tube for the free film portion between said slits, a slidable pressure plate arranged behind the film in said recess, an aperture plate arranged in front of said film cooperating with said pressure plate, and an intermittently moving film claw engaging said film when it is not enclosed by said tubular enclosing means.

93. In a film camera, in combination, a removable film magazine comprising a front wall provided with two parallel slits normal to the side wall of said magazine enabling exit and entry of film moving between said slits, a receding wall portion between said slits, and at least one sleeve-shaped film guiding member adapted to slide through said slits into and out of said magazine in the longitudinal direction of the film moving between said slits and to form a light-tight enclosing tube between said slits, a slidable presser plate arranged behind the film in said recess, an apertured plate arranged in front of said film and cooperating with said pressure plate, an intermittently moving film member engaging said film when it is not enclosed by said enclosing tube, and means operable by an operator of the camera and adapted to move said sleeve-shaped tubular film guiding member and said pressure plate in timed relation.

94. In a film camera, in combination, a removable film magazine comprising a front wall provided with two parallel slits normal to the side walls of said magazine enabling exit and entry of the film moving between said slits, a receding wall portion between said slits, and at least one sleeve-shaped film guiding member adapted to slide through said slits into and out of said magazine in a longitudinal direction of the film moving between said slits and to form a light-tight enclosing tube for the free film portion between said slits, a slidable pressure plate arranged in front of said film and cooperating with said pressure plate, an intermittent film moving member engaging said film when it is not enclosed by said tubular enclosing member, a cover for enclosing said magazine when it is disposed within said camera, a member associated with the closing and opening of said camera cover, means cooperating with said member associated with said camera closing and opening means, said means being adapted to move said sleeve-shaped film guiding member and said movable pressure plate at the will of the operator of the camera, in such manner that the film portion between said slits is enclosed against light at the time when said pressure plate is moved out of contact with the free film portion, and vice versa.

95. A film magazine for use in a film handling apparatus which has a magazine receiving compartment, said magazine having a recess formed within an edge wall thereof, a film being housed within said magazine and passing from a delivery coil out of said recess across said recess and within the magazine upon the other side of said recess and to a take-up coil within said magazine, said recess being formed with openings for such passage, and operable means within said magazine for forming a completely enclosed protective channel leading from said delivery coil across said recess toward said take-up coil, and means effective after said magazine has been placed within said compartment of said apparatus for destroying the portion of said channel across said recess.

96. For use in a film handling apparatus having a magazine receiving compartment and instrumentalities adapted to engage a film housed within a magazine placed within said compartment; said magazine being formed with a recess in an edge wall thereof, a film passing from a delivery coil within said magazine out of said magazine across said recess back into said magazine and to a take-up coil within said magazine, film guiding channels leading from and to said recess within said magazine through which the film passes, an enclosed film guiding channel leading across said recess and joining said previously mentioned channels for protecting the film from light entering through recess, and means effective after said magazine has been placed within said magazine receiving compartment of said apparatus for destroying said channel across said recess so that film may be engaged by said film handling and film guiding instrumentalities of said apparatus.

97. In combination, a film handling apparatus and a magazine for use therewith, said magazine including a recess in an edge wall thereof, a film passing from a delivery mass within said magazine across said recess and to a take-up mass within said magazine, operable means for creating a first or enclosed and protective channel across said recess when said magazine is disposed outside of said apparatus; said apparatus including a compartment for the reception of said magazine, means some of which are operable for creating a second or feeding channel for the film across said recess effective when said magazine is placed in its compartment, and means for then feeding the film from said delivery coil through said feeding channel toward said take-up coil; and sequential control means engaging both of said channel forming means when said magazine is disposed within said apparatus for first destroying said portion of said first channel leading across said recess and thereafter operating said operable means for creating said second or feeding channel.

98. In combination, a film handling apparatus and a magazine for use therewith; said magazine being adapted to support a delivery coil and a take-up coil of a film, a light admitting opening admitting opening being formed in an edge wall of said magazine between said coils, the film passing from a delivery coil past said opening to a take-up coil, and operable means disposed opposite said light admitting opening for creating a channel for protecting both sides of the film from light as it passes said opening, said channel including walls disposed upon all sides of the film; said apparatus including a compartment for the reception of said magazine, film guiding members at least one of which is movable extending within said compartment and when said magazine is within said compartment adapted to engage the film as it passes said opening; and sequential control means operatively engaging said channel and said operable member and including instrumentalities for first moving said channel from across said recess and thereafter moving said operable member into guiding relation with the film.

99. In a film magazine including a substantially rectangular casing with a recess formed in an edge wall thereof, a delivery channel leading to one side of said recess from a delivery coil, a take-up channel aligned with said delivery channel and leading from the other side of said recess toward a take-up coil, the front side of each of said channels being formed by said edge wall and the back side thereof being formed by a guide plate disposed parallel to said front edge wall and spaced inwardly therefrom, a tubular film guiding and light-trapping member disposed within one of said channels, and means for moving said member across said recess to and from a position wherein one end of said member is disposed within the other of said channels, the film passing from a delivery coil through said delivery channel and said tubular member and said take-up channel and to a take-up coil.

100. A film magazine including a substantially rectangular casing with a recess formed in a front edge wall thereof, a film being housed within said magazine and passing from a delivery coil within said magazine to a first opening in an edge wall bounding said recess adjacent the upper front edge of said recess and across said recess and into the interior of said casing through a second opening in said edge wall bounding said recess aligned with said first opening and adjacent the lower front edge of said recess, said edge walls of said recess being formed with such openings, a fixed film guide disposed parallel to said front edge wall and toward the interior of said magazine and extending from said first opening toward said delivery coil, a film guide fixed within said magazine parallel to said front edge wall and extending from said second opening toward said take-up coil, said film guides thereby cooperating with said front edge wall to provide a delivery channel and a take-up channel respectively, a movable tubular guiding and light protective member disposed within one of said channels and guided by the walls thereof in movement between a position entirely within one of said channels and one connecting said channels and bridging said recess, the film passing through said tubular member and said channels, and means by which said member may be moved between said positions.

101. In combination, a film handling apparatus and a magazine for use therewith, said magazine including a recess formed in an edge wall thereof, a film passing from the magazine through a first opening at an upper front edge of said recess and across said recess and back into the magazine through a second opening being aligned with said first opening and at the lower edge of said recess, said edge wall being formed with such openings, an operable light trapping tube extending across said recess and enclosing the length of film which passes thereover, operating means for moving said tube from a first or protective position wherein it encloses the film across said recess to a second or running position within the body of the magazine wherein it frees the film from engagement by an apertured fixed gate member disposed upon an apparatus; said apparatus including a compartment for the reception of said magazine, a fixed apertured gate member extending within said compartment to engage a film in said magazine as it passes over the front of said recess, means engaging the film for feeding it across said recess when the magazine is disposed within its compartment, a presser member disposed therein and so positioned that when the magazine is placed in said compartment it lies between said light trapping tube and the back wall of said recess, and means for moving said presser member toward the film and said light trapping means from said first to said second position before said presser member has been so moved, said moving means including instrumentalities effective when the magazine is positioned within said comparament for engaging said operating means upon said magazine for said presser member.

102. In a film magazine having side walls and relatively narrow edge walls at right angles thereto, one of said edge walls being formed with a light admitting opening, a delivery guide parallel to said front edge wall and spaced toward the interior of said magazine from said front edge wall and extending from said opening along said edge wall and terminating inwardly in a delivery resilient film engaging compensating and tensioning formation, said guide and said formation together with said edge wall of said magazine forming a delivery channel, a take-up guide parallel to said front edge wall and spaced therefrom toward the interior of said magazine from said front edge wall and extending from said opening along said front edge wall and terminating inwardly in a take-up resilient film engaging compensating and tensioning formation, said guide and said formation together with said edge wall of said magazine forming a take-up channel, said light trap being disposed in one of said channels, and means for moving said light trap across said opening and to a point where the leading end thereof is within the other of said channels, a film moving from a delivery coil along said delivery formation through said delivery channel across said opening through said take-up channel and to a take-up coil, said channels thereby furnishing a guide way for said light trap as well as for the film.

103. In a film magazine having side walls and relatively narrow edge walls at right angles thereto, a front of said edge walls being formed with a light admitting opening, a delivery guide parallel to said front edge wall and spaced toward the interior of said magazine from said front edge wall and extending from said opening along said edge wall and terminating inwardly in a delivery resilient film engaging compensating and tensioning formation, said guide and said formation together with said edge wall of said magazine forming a delivery channel, a take-up guide parallel to said front edge wall and spaced therefrom toward the interior of said magazine and extending from said opening along said front edge wall and terminating inwardly in a take-up resilient film engaging compensating and tensioning formation, said guide and formation together with said edge wall of said magazine forming a take-up channel, a light trap in the form of a single blade, said blade being disposed in one of said channels, means for moving said blade across said opening and to a point where the leading end thereof is within the other channel, a film moving from a delivery coil along said delivery formation through said delivery channel across said opening through said take-up channel to a take-up coil, said channel thereby furnishing a guide-way for said light trap as well as for the film and said light trap when moved across said opening protecting the film from light.

104. In a film magazine having side walls and relatively narrow edge walls at right angles thereto, one of said edge walls being formed with a light admitting opening, a delivery guide parallel to said front edge wall and spaced toward the interior of said magazine from said front edge wall and terminating inwardly in a delivery resilient film engaging compensating and tensioning formation, said guide and said formation together with said edge wall of said magazine forming a delivery channel, a take-up guide parallel to said front edge wall and spaced therefrom toward the interior of said magazine from said front edge wall and extending from said opening along said front edge wall and terminating inwardly in a take-up resilient film engaging compensating and tensioning formation, said guide and said formation together with said edge wall of said magazine forming a take-up channel, a presser member disposed opposite said opening and extending there across from the lower edge of said delivery guide to the upper edge of said take-up guide, a light trap, said light trap being disposed in one of said channels adjacent the front edge wall of said magazine, and means for moving said light trap across said opening to a position opposite said presser member and to a point where the leading end thereof is within the other of said channels, said light trap and said presser member thereby forming a tubular extension of said channels which bridges the space therebetween, and means associated with said presser member for completing the protection of the film from light, a film moving from a delivery coil along said delivery formation through said delivery channel and across said opening through said channel formed as above stated through said take-up channel and to a take-up coil, said channels and said light trap and said presser member thereby furnishing a guide way for the film.

105. In a film magazine having side walls joined by edge walls at right angles thereto with one of said edge walls having a light receiving opening, a sleeve-shaped film guiding tubular member movable between a position opposite said opening and one to one side thereof, means for guiding said member in such movement, and means for so moving said member, a film passing from a delivery coil through said tubular member to a take-up coil.

106. In a film camera in combination, a removable film magazine comprising a front wall provided with a light admitting opening, a tubular sleeve-shaped protective member movable between a position opposite said opening and one spaced therefrom, a film passing from a delivery coil through said member to a take-up coil, a slidable pressure plate arranged behind the film opposite said opening, an aperture plate arranged in front of said pressure plates, and a film claw engaging the film at a point at which it is not enclosed by said tubular member.

107. In a film camera in combination, a removable film magazine comprising a front wall provided with a light admitting opening, a tubular sleeve-shaped member movable between a position opposite said opening and one spaced therefrom, means for moving said member between said positions, a film passing from a delivery coil through said member to a take-up coil, a slidable pressure plate arranged behind the film opposite said opening, means for moving said pressure plate toward and away from the film, an apertured plate arranged in front of said pressure plate, a film claw engaging the film at a point at which it is not enclosed by said tubular member, and control mechanism including instrumentalities operatively engaging said means for moving said tubular member and said means for moving said plate and effective for operating each thereof.

108. In a film camera in combination, a removable film magazine comprising a front wall provided with a light admitting opening, a tubular sleeve-shaped member movable between a position opposite said opening and one spaced therefrom, means for moving said member between said positions, a film passing from a delivery coil through said member to a take-up coil, a slidable pressure plate arranged behind the film opposite said opening, means for moving said pressure plate toward and away from the film an aperture plate arranged in front of said pressure plate, and control mechanism including instrumentalities operatively interconnecting said means for moving said tubular member and said means for moving said plate and effective for operating each thereof in sequential relation to the operation of the other thereof.

109. In a film magazine, said magazine including an edge wall with a light admitting opening therein and housing a delivery and take-up coil of a film which passes said opening; an operable light trap, said light trap including a flat supporting side member, a relatively short tubular member supported by said flat member adjacent one edge thereof, and a relatively longer tubular member supported by said flat member at a distance from said first mentioned tubular member, the length of said open space approximating the length of said light admitted opening, and said flat member including a formation adapted to cooperate with a motion transmitting member disposed upon the film handling apparatus with which said magazine is to be used, and means for guiding said flat member as said light trap is moved across said opening, the film as it passes from said delivery coil to said take-up coil passing through said tubular formation and across the open space therebetween, so that when said relatively longer tubular member is disposed opposite said opening the film is protected from light entering through said opening but when said open space between said tubular members is disposed opposite said opening the film is exposed to said light.

110. In a film magazine, said magazine including an edge wall with a light admitting opening therein and housing a delivery and take-up coil of a film which passes said opening, an operable light trap, said light trap including a flat supporting side member, a relatively short tubular member supported by said flat member adjacent one edge thereof, and a relatively longer tubular member supported by said flat member at a distance from said first mentioned tubular member, the length of said open space approximating the length of said light admitted opening, and said flat member including a socket adapted to cooperate with a motion transmitting pin disposed upon the film handling apparatus with which said magazine is to be used, and means for guiding said flat member as said light trap is moved across said opening, the film as it passes from said delivery coil to said take-up coil passing through said tubular formation and across the open space therebetween, so that when said relatively longer tubular member is disposed opposite said opening the film is protectd from light entering through said opening but when said open space between said tubular members is disposed opposite said opening the film is exposed to said light.

111. In a film magazine adapted for use with a film handling apparatus, said magazine having an edge wall formed with a light admitting opening and housing a film which passes said opening as it is moved from a delivery coil toward a take-up coil, a light trap movable in relation to said opening along said edge wall, said light trap comprising two tubular members spaced from each other a distance approximating the height of said opening through the interior of which the film passes from said delivery coil toward said take-up coil, the edges of said tubular structures being continuous and forming guides for the edges of the film both within said tubes and along said aperture as well as connecting and supporting said structures, and a formation adapted to coact with an operable motion transmitting member carried by said apparatus, with which said tubular light trap is used, the movement of said member of said apparatus being effective alternatively to dispose the open space between said tubular structures opposite said light admitting opening of said magazine and to dispose a solid portion of said tubular structure, and means for guiding said tubular member in such movement.

WARREN DUNHAM FOSTER.

REFERENCES CITED

The following references are of record in the file of this patent:

UNITED STATES PATENTS

| Number | Name | Date |
|---|---|---|
| 1,839,064 | Thornton | Dec. 29, 1931 |
| 1,914,214 | Porter | June 13, 1933 |
| 2,109,538 | Kindelmann | March 1, 1938 |
| 2,132,714 | Wittet et al. | Oct. 11, 1938 |
| 2,165,706 | Howell | July 11, 1939 |
| 2,201,886 | Dalotel | May 21, 1940 |
| 2,319,530 | Bolsey | May 18, 1943 |
| 2,326,654 | Jagust | Aug. 10, 1943 |
| 2,342,509 | Gaty et al. | Feb. 22, 1944 |
| 2,352,181 | Bolsey | June 27, 1944 |

FOREIGN PATENTS

| Number | Country | Date |
|---|---|---|
| 697,266 | Germany | Oct. 10, 1940 |